(12) United States Patent
Bedekar et al.

(10) Patent No.: US 11,626,917 B2
(45) Date of Patent: Apr. 11, 2023

(54) BEAM SELECTION ACCELERATOR FOR WIRELESS NODE SCHEDULER

(71) Applicant: NOKIA SOLUTIONS AND NETWORKS OY, Espoo (FI)

(72) Inventors: Anand Bedekar, Glenview, IL (US); Rajeev Agrawal, Glenview, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 62 days.

(21) Appl. No.: 15/733,680

(22) PCT Filed: Mar. 29, 2018

(86) PCT No.: PCT/US2018/025305
§ 371 (c)(1),
(2) Date: Sep. 28, 2020

(87) PCT Pub. No.: WO2019/190538
PCT Pub. Date: Oct. 3, 2019

(65) Prior Publication Data
US 2021/0028847 A1    Jan. 28, 2021

(51) Int. Cl.
*H04B 7/06* (2006.01)
*H04B 7/0452* (2017.01)
(Continued)

(52) U.S. Cl.
CPC ......... *H04B 7/0695* (2013.01); *H04B 7/0452* (2013.01); *H04L 5/0023* (2013.01);
(Continued)

(58) Field of Classification Search
CPC ... H04B 7/0695; H04B 7/0452; H04L 5/0023; H04L 5/0037; H04W 72/121; H04W 72/1289; H04W 4/08
See application file for complete search history.

(56) References Cited

U.S. PATENT DOCUMENTS

| | | | |
|---|---|---|---|
| 2012/0062420 A1* | 3/2012 | Chang | H01Q 21/29 342/372 |
| 2014/0170963 A1* | 6/2014 | Delaveau | H04K 3/28 455/1 |

(Continued)

OTHER PUBLICATIONS

International Search Report and Written Opinion for International Application No. PCT/US2018/025305, dated Dec. 14, 2018, 16 pages.

(Continued)

*Primary Examiner* — Ian N Moore
*Assistant Examiner* — Latresa A McCallum
(74) *Attorney, Agent, or Firm* — Brake Hughes Bellermann LLP

(57) ABSTRACT

An apparatus includes a beam selection hardware accelerator for determining a set of beams to be used for data scheduling by a wireless node for a transmission time interval, the beam selection hardware accelerator being configured to: receive a beam information and information indicating an angular separation of beams for a set of selected beams; create a graph based on the beam information and the minimum angular separation; select a set of (Continued)

beams, out of a plurality of beams, as a maximum weight independent set of beams based on the created graph; and provide a notification of the selected set of beams.

19 Claims, 10 Drawing Sheets

(51) Int. Cl.
    *H04L 5/00*         (2006.01)
    *H04W 72/121*    (2023.01)
    *H04W 72/12*     (2023.01)

(52) U.S. Cl.
    CPC ......... *H04L 5/0037* (2013.01); *H04W 72/121* (2013.01); *H04W 72/1289* (2013.01)

(56) References Cited

U.S. PATENT DOCUMENTS

| | | | |
|---|---|---|---|
| 2015/0051866 A1* | 2/2015 | Chu | G06Q 50/06 702/150 |
| 2016/0088648 A1* | 3/2016 | Xue | H04L 1/0026 370/252 |
| 2017/0126309 A1* | 5/2017 | Rupasinghe | H04B 7/024 |
| 2017/0331533 A1* | 11/2017 | Strong | G01C 21/18 |

OTHER PUBLICATIONS

3GPP TSG-RAN WG1 #90, R1-1713400; "Tagging and Indication of DL Beams", Prague, P.R. Czechia; Aug. 21-25, 2017, 9 pages.

Michaloliakos et al.; "Joint User-Beam Selection for Hybrid Beamforming in Asynchronously Coordinated Multi-Cell Networks"; 2016 Information Theory and Applications Workshop (ITA); La Jolla, CA, USA; Jan. 31, 2016; 10 pages.

G. Valiente; A New Simple Algorithm for the Maximum-Weight Independent Set Problem on Circle Graphs; Algorithms and Computation; ISAAC 2003; Lecture Notes in Computer Science, vol. 2906; Springer, Berlin, Heidelberg; 2003; pp. 129-137.

Kako et al.; "Approximation Algorithms for the Weighted Independent Set Problem in Sparse Graphs"; Discrete Applied Mathematics; vol. 157, Issue 4; Feb. 2009; pp. 617-626.

Sanghavi et al.; "Message Passing for Maximum Weight Independent Set"; IEEE Transactions on Information Theory; vol. 55, No. 11; Nov. 2009; pp. 4822-4834.

Liang et al.; "On the Problem of Finding All Maximum Weight Independent Sets in Interval and Circular-arc Graphs"; 1991 Symposium on Applied Computing; Kansas City, MO, USA; Apr. 3-5, 1991; 6 pages.

Office Action for European Application No. 18721528.0, dated Sep. 28, 2022, 9 pages.

\* cited by examiner

Graph for Azimuth GOB with B=8, d=2

BEAM SELECTION ACCELERATOR FOR WIRELESS NODE SCHEDULER

CROSS-REFERENCE TO RELATED APPLICATIONS

This application is a national stage entry of International Application No. PCT/US2018/025305, filed Mar. 29, 2018, entitled "BEAM SELECTION ACCELERATOR FOR WIRELESS NODE SCHEDULER" which is hereby incorporated by reference in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the Long Term Evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. A goal of 5G is to provide significant improvement in wireless performance, which may include new levels of data rate, latency, reliability, and security. 5G NR may also scale to efficiently connect the massive Internet of Things (IoT), and may offer new types of mission-critical services. BSs in 5G/NR may be referred to as gNBs.

SUMMARY

According to an example embodiment, a method is provided for determining a set of beams to be used for data scheduling by a wireless node for a transmission time interval, including: receiving a beam information and information indicating an angular separation of beams for a set of selected beams; creating a graph based on the beam information and the angular separation; selecting a set of beams, out of a plurality of beams, as a maximum weight independent set of beams based on the created graph; and providing a notification of the selected set of beams.

According to an example embodiment, an apparatus includes at least one processor and at least one memory including computer instructions, when executed by the at least one processor, cause the apparatus to: receive a beam information and information indicating an angular separation of beams for a set of selected beams; create a graph based on the beam information and the angular separation; select a set of beams, out of a plurality of beams, as a maximum weight independent set of beams based on the created graph; and, provide a notification of the selected set of beams.

According to an example embodiment, a computer program product includes a computer-readable storage medium and storing executable code that, when executed by at least one data processing apparatus, is configured to cause the at least one data processing apparatus to perform a method including: receiving a beam information and information indicating an angular separation of beams for a set of selected beams; creating a graph based on the beam information and the angular separation; selecting a set of beams, out of a plurality of beams, as a maximum weight independent set of beams based on the created graph; and providing a notification of the selected set of beams.

According to an example embodiment, an apparatus may include a beam selection hardware accelerator configured to determine a set of beams to be used for data scheduling by a wireless node for a transmission time interval, including being configured to: receive a beam information and information indicating an angular separation of beams for a set of selected beams; create a graph based on the beam information and the angular separation; select a set of beams, out of a plurality of beams, as a maximum weight independent set of beams based on the created graph; and provide a notification of the selected set of beams.

According to an example embodiment, an apparatus includes a shared memory; a processor core, including computer instructions, when executed by the processor, cause the processor core to: determine a beam information for a plurality of beams; determine information indicating an angular separation for a selected set of beams; provide the beam information and the information indicating the minimum angular separation to a beam selection hardware accelerator; and the beam selection hardware accelerator that is configured to: receive the beam information and the information indicating the angular separation from the shared memory; create a graph based on the beam information and the minimum angular separation; select a set of beams as a maximum weight independent set of beams based on the created graph; and provide a notification to the processor of the selected set of beams.

The details of one or more examples of embodiments are set forth in the accompanying drawings and the description below. Other features will be apparent from the description and drawings, and from the claims.

DETAILED DESCRIPTION

Figure 1:
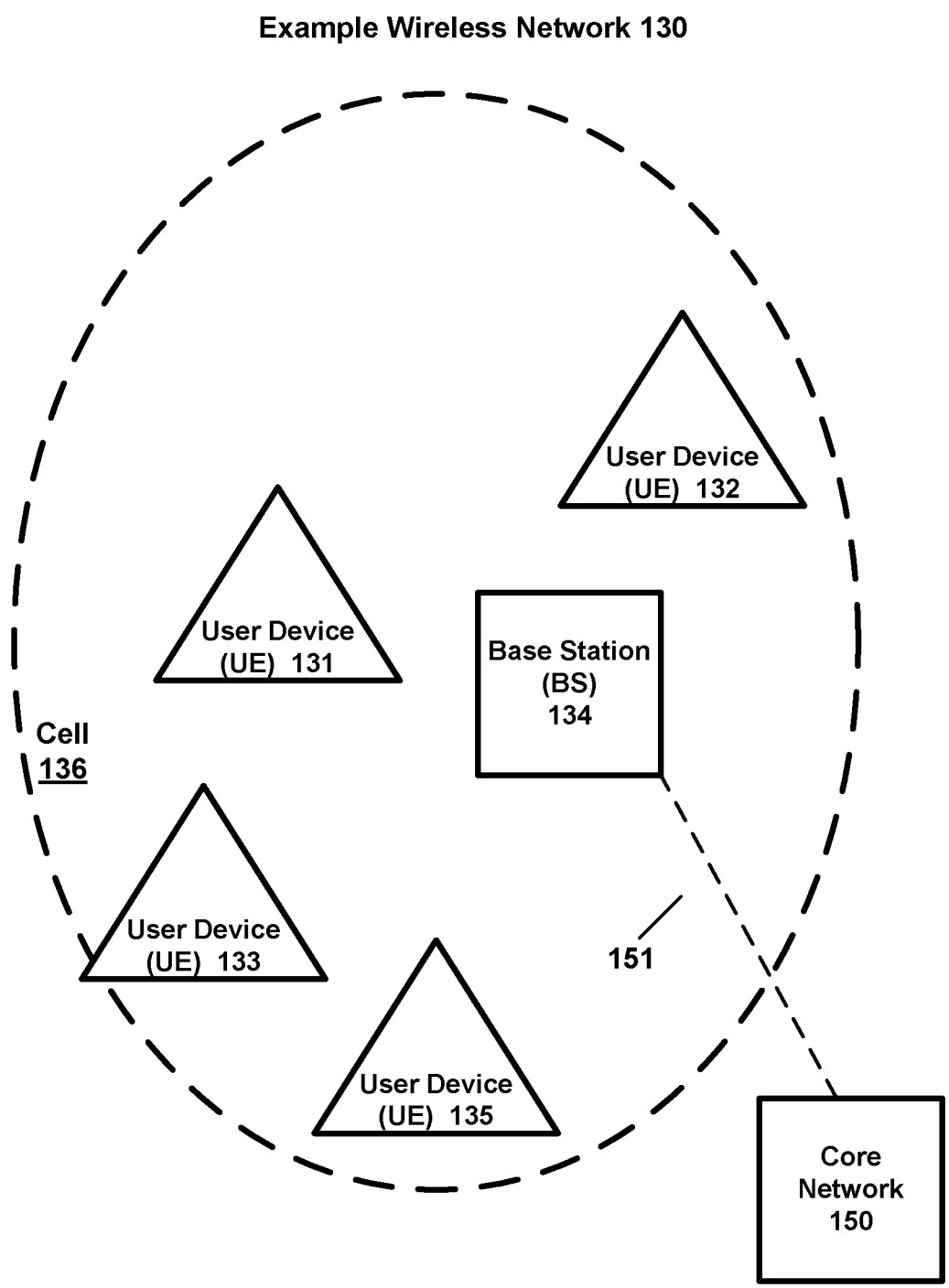
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB, or a network node. At least part of the functionalities of an access point (AP), base station (BS) or (e)Node B (eNB) or gNB may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via e.g., a Si interface in LTE (or a NG interface in 5G/NR) 151. This is merely one simple example of a wireless network, and others may be used.

A user device (user terminal, user equipment (UE) or mobile station) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network. Also, a user device may also be, for example, a nearly exclusive downlink only device, that may download images, video, or other content from a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), wireless relaying including self-backhauling, D2D (device-to-device) communications, and ultra-reliable and low-latency communications (URLLC). Scenarios may cover both traditional licensed band operation as well as unlicensed band operation.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability)

The various example embodiments may be applied to a wide variety of wireless technologies or wireless networks, such as LTE, LTE-A, 5G, cmWave, and/or mmWave band networks, IoT, MTC, eMTC, eMBB, URLLC, etc., or any other wireless network or wireless technology. These example networks, technologies or data service types are provided only as illustrative examples.

Multiple-input and multiple-output (MIMO), may include the use of multiple antennas at both a transmitter and a receiver to improve communication performance. It is often considered one of several forms of smart antenna technology. MIMO technology frequently offers significant increases, compared to single input/output technology, in data throughput and link range without additional bandwidth or transmit power. MIMO systems generally achieve this by higher spectral efficiency (e.g., more bits per second per hertz of bandwidth) and link reliability or diversity (e.g., reduced fading).

Also, according to an example implementation, various example embodiments may relate, for example, to 5G radio access systems (or other systems) with support for Massive MIMO (multiple input, multiple output) and optimized for operating in high carrier frequencies such as cmWave frequencies or mmWave frequencies, as examples, according to an illustrative example embodiment. Those illustrative systems are typically characterized by the need for high antenna gain to compensate for increased pathloss and by the need for high capacity and high spectral efficiency to respond to ever increasing wireless traffic. According to an example embodiment, the increased attenuation at higher carrier frequencies may, for example, be compensated by introducing massive (multi-element) antenna arrays and correspondingly antenna gain via beamforming at the base station (BS) and/or user device. The spectral efficiency may typically improve with the number spatial streams the system can support and thus with the number of antenna ports at the BS.

According to an example embodiment, spatial multiplexing may include a transmission technique in MIMO wireless communication to transmit independent and separately encoded and beamformed data signals, so-called streams, from each of the multiple transmit antennas.

Beamforming may refer to a technique wherein different weights are used on different antennas in order to form the signal for transmission. Beamforming using such a combination of weights on different antennas may be used, for example, to generate a beam that points in a certain direction, so as to focus the energy of the transmission in that direction, for example in the direction of a particular user or UE. A base station (BS) may be capable of transmitting signals on multiple beams simultaneously, for example by applying different combinations of weights to the transmitting antennas for each beam. A stream may refer to the data transmitted on a beam. Within a beam, there may further be multiple streams transmitted, for example utilizing the separation of polarizations of transmitted signals so that a separate stream can be transmitted on each polarization. The number of streams that may be transmitted by a device or BS may refer to the number of separately encoded and beamformed signals that may be simultaneously transmitted by the BS, for example. The number of beams that may be transmitted by a device or BS may refer to the number of beams that can be separately generated and simultaneously transmitted by the BS. The number of layers that a device or base station can transmit may refer to a flexible combination of the number of beams and streams. The number of beams or layers or streams that a device or BS can simultaneously generate may, for example, be dependent on the capabilities of the device or BS, such as the number of antennas, the number of transceivers, the number of phase shifters or other elements used to impart weights to the transmitting antennas, the capabilities of the device or BS for signal processing, and the like.

The beams that a BS can simultaneously generate may be taken from a larger set of allowed beams, typically known as a grid of beams. In a grid of beams (sometimes abbreviated as GOB), the set of allowed beams may be chosen so that each beam points in a certain pre-set direction (for example using a corresponding set of weights on the antennas as described above). The beams in the GOB may be comprised, for example, so as to cover the desired area of transmission of the cell with reasonable coverage using a given number of beams. In some cases, the beams in the GOB may be equi-spaced (for example) in the sense of angular separation between the beam pointing directions. In some embodiments, the BS may not have a defined grid of beams with beams pointing in pre-specified directions, but rather may be able to form beams that point in any arbitrary direction (for example using suitable weights on the antennas as described above). The pointing direction of a beam is typically the direction where the radiated power is highest, and may be variously known as the boresight direction or the beam center direction. A beam typically has a spread, since the energy is not focused only in a single direction. Further, due to the physics of beam generation, a beam may have side lobes that radiate energy in directions away from the pointing direction. Thus, the signals of different beams may overlap with each other. That is, the transmitted signal of one beam may cast some energy in the reception area of another beam. Due to this, the signal of one beam may be perceived as interfering with the signal of another beam. A grid of beams (or more generally, any set of beams) may be considered as an Azimuth GOB or two-dimensional or 2D GOB (or more generally, an Azimuth or two-dimensional or 2D beam set) if the pointing directions of the beams lie in a plane or two-dimensional region. In an Azimuth GOB, typically the elevation angle of the pointing directions of all the beams is the same. A GOB (or more generally, any set of beams) may be considered as a three-dimensional or 3D GOB (or 3D beam set) if the pointing directions of the beams do not all lie in a given plane or a two-dimensional region, but are separated in three dimensions. In a 3D GOB in general, the pointing directions of the beams may differ in the elevation angle.

Furthermore, in some cases, a BS may transmit data during a Transmission Time Interval (TTI), or subframe, via a set of multiple (or a plurality of) transmit beams, e.g., to reach multiple user devices/UEs within a cell. Each UE may measure reference signals for each of a plurality of beams, and then send a measurement report to the BS to indicate one or more best beams or preferred beams (e.g., beam(s) having a highest received signal strength (RSSI), a highest reference signal received power (RSRP) and/or a highest reference signal received quality (RSRQ), or based on other signal measurement criteria, as measured by the UE). Alternatively, the BS may infer or determine the best or preferred beams for a UE from the signals it receives from the UE, such as sounding reference signals, for example by estimating the signal strength and phase shift of the UE's signal received at each receiving antenna and performing an estimation based on eigenvalue decomposition of the channel matrix. Also, the BS may maintain for each UE a metric that may indicate a priority of transmission for the UE, e.g., based on a quality of service (QoS) (e.g., such as a minimum data rate or minimum data throughput) for the UE, a proportionally fair (PF) metric (e.g., in which resources may be allocated proportionally fair to the UEs), or other UE metric that may indicate a relative priority of each UE for transmission by the BS. The BS has to select, during each TTI or subframe, a set of multiple (or plurality of) beams to reach a subset of UEs within the cell, and to assign radio resources (such as frequency domain resources within the TTI, or physical resource blocks (PRBs)) to the selected UEs and the corresponding beams. This is typically referred to as scheduling. The scheduler may take into account the metrics of the users/UEs, the preferred beam(s) for each UE, and the potential interference or overlap between the beams used to transmit to the different UEs, in various ways.

Thus, each beam may be assigned a beam weight (or beam metric) that may be based on the UE metrics (e.g., PF metric for each UE, which may indicate a priority of the UE for transmission) and the preferred beam(s) for each of the UEs. Thus, for example, a preferred (or best) beam for a UE having a higher UE metric may be assigned a higher beam weight (or higher beam metric), as compared to a beam that is not a preferred beam of a UE or a beam that is a preferred beam of a UE that has a lower UE metric (e.g., a UE having a lower PF metric, a lower QoS metric, or a lower priority for transmission). In this manner, for example, a greater beam weight may indicate prioritization of a beam for transmission that may be a best or preferred beam of a UE that is a higher priority for transmission (e.g., for a UE having a greater UE metric), while a lower beam weight (or lower beam metric) may indicate a lower prioritization of a beam for transmission. Beam metrics may be updated from time to time, e.g., every transmission time interval (TTI) or subframe, or other time interval, for example. In some cases where a given beam may be the preferred beam for multiple UEs, the beam weight may be assigned taking into account the metrics of the multiple UEs in various ways. For example, the weight of the beam may be assigned as the maximum of the weights of the UEs for which that beam is the preferred beam, or a weighted average of the weights of such UEs, etc.

Each BS may be able to transmit only up to a maximum number of beams at a time, e.g., up to 4 beams, 6 beams, 8 beams, or other number of beams, at a time, e.g., during each TTI or other time period. Thus, for example, a BS may select a set of beams that may be reported as a best beam(s) or preferred beam(s) for one or more UEs with a transmission priority for that TTI based on the metrics (e.g., transmission priority) for the UEs of the cell. However, as described in greater detail herein below, selecting a set of beams to be used for data scheduling or data transmission may be a computationally expensive operation.

Various wireless devices (such as a BS) may include a data or packet scheduler (e.g., a Media Access Control (MAC) scheduler) for scheduling the transmission of data among one or more transmission beams that may be transmitted each Transmission Time Interval (TTI) or subframe, or other time interval. A scheduler may perform a number of compute intensive tasks. It may also be advantageous to perform scheduling (and/or have a scheduler), with low power consumption.

A processor (or central processing unit (CPU)) may include a general purpose software-programmable electronic device (or computing component) that is programmable via software or computer program instructions. The processor (or CPU) may execute software or program instructions stored in (and retrieved by the processor from) memory to perform one or more operations or tasks. Some processors or CPUs may be multi-core processors. According to an example embodiment, a multi-core processor may include a single computing component with two or more independent processing units called cores (or processor cores), where each processing core may read and execute program instructions.

According to an example embodiment, one way to reduce power consumption for data scheduling, is to use lower power-consumption cores such as one or more ARM cores (processor cores), to keep energy and costs down. However, in many cases these low power processor cores have typically lower single-thread performance, which, in some cases, may be insufficient to handle some of the compute intensive tasks required for a scheduler (or for data or packet scheduling) within the time constraints for such tasks.

Further, the timing deadlines for execution of a scheduler may be very short, as scheduling (and any associated calculations or tasks) may be a real-time task that may be executed in (or for) each TTI (transmission time interval), for example. In 5G/New Radio (NR), compared to LTE, this problem may be further exacerbated by various factors, such as, for example:

(i) larger bandwidths (more radio resources for the scheduler to allocate), (ii) massive MIMO (larger number of antennas, or larger number of simultaneous beams to allocate, and correspondingly higher complexity of algorithms to select a set of beams for a TTI from within a larger set of possible beams), (iii) smaller TTI (transmission time interval, or subframe) durations (e.g. 0.5 ms or even 0.125 ms in 5G, compared to 1 ms in LTE). Thus, based on may be even less time to complete the scheduling, including various compute intensive tasks for scheduling (e.g., including selection of UEs, beams and resources), for each TTI, based on a shorter or smaller TTI duration, the scheduler may have less time to select a set of beams and schedule or allocate resources for transmission during each TTI.

Thus, it may be desirable to find solutions that can accelerate the execution of one or more compute-intensive tasks in the scheduler so that they can be executed within the tight timing deadlines, and/or while still allowing the use of lower-power CPU (Central Processing Unit, or processor) cores (e.g., like ARM cores or other low power processor cores) for at least some of the functions of the scheduler.

Figure 2:
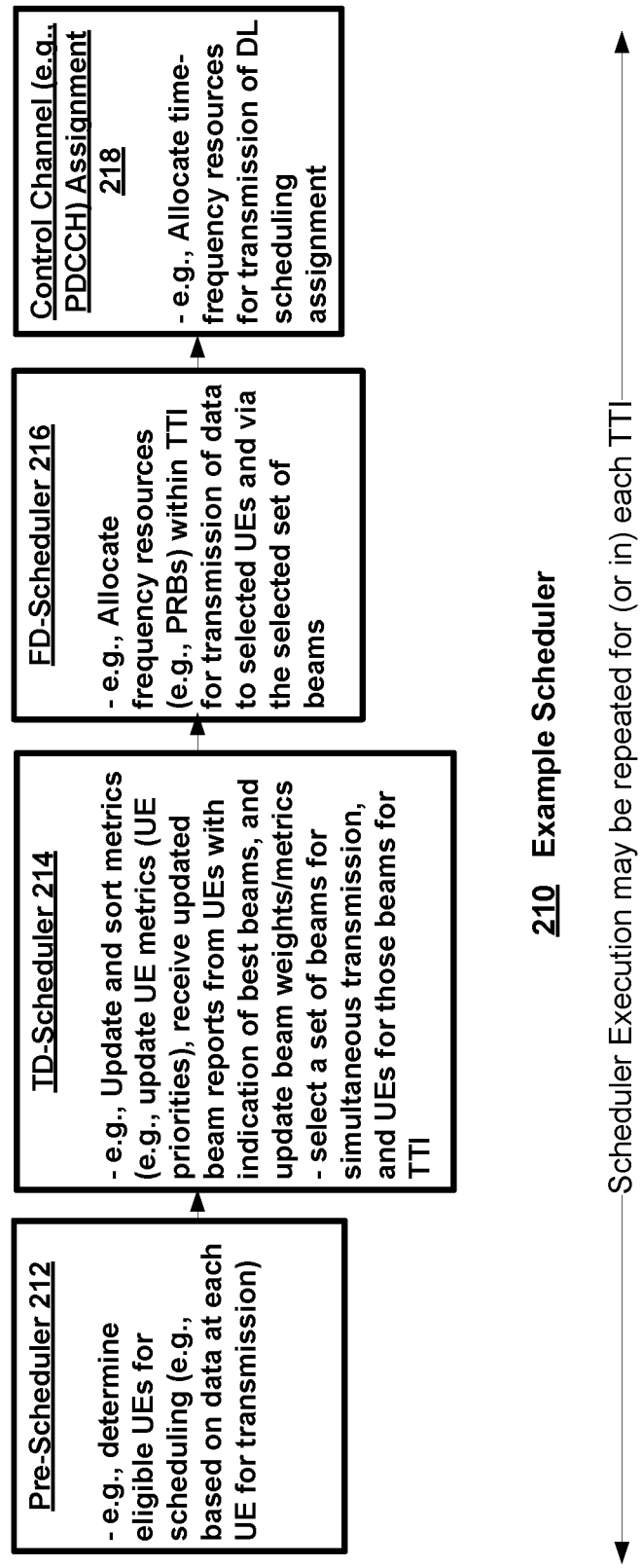
FIG. 2 is a diagram illustrating a scheduler according to an example embodiment.

FIG. 2 is a diagram illustrating a scheduler according to an example embodiment. Although the various components or functions of a scheduler (e.g., data scheduler, packet scheduler, or MAC packet scheduler) may vary, or may have different names, the example scheduler 210 of FIG. 2 provides an illustrative example of a scheduler. A pre-scheduler 212 may, e.g., determine a set of eligible UEs for scheduling for the TTI, e.g., based on availability of data for transmission, or other criteria.

A time domain (TD) scheduler 214 may perform time domain scheduling, e.g., which may include updating and sorting metrics or weights, such as, for example, receiving an updated beam report from one or more UEs that may indicate a best or preferred beam(s) for the UE, updating UE metrics (e.g., such as a proportionally fair (PF) metric (or other UE metric that may indicate a priority of the UE for transmission) for each UE, and updating beam weights (which may also be referred to as beam metrics) for each beam, and selecting a set of beams for simultaneous transmission, and selecting a set of UEs for those beams, for transmission during the TTI. A beam weight (or beam metric) may be determined for each beam based on the UE metrics (e.g., based on a PF metric or QoS metric for each of the UEs for which that beam is the preferred beam), and the best or preferred beam(s) for each of the UEs. For example, a greater (or higher) beam weight may be assigned to a beam that is a preferred beam of a UE that has a greater (e.g., higher priority) UE metric, while a lower beam weight (lower beam metric) may be assigned to a beam that is either not a best or preferred beam for a UE, or may be a preferred beam of a UE having a lower UE metric (e.g., lower priority for transmission, such as a lower PF metric). In this manner, the beam weights may indicate a relative priority of beams to be used for transmission in a TTI or other time period. According to an example embodiment, as part of the TD scheduler 214, a set of beams may be selected for transmission (for the TTI) based on the weights of the beams, e.g., so as to maximize the sum of beam weights of the selected set. For example, a maximum weight independent set (MWIS) calculation may be performed to determine a set of transmit beams (to be used by the BS to perform downlink transmission for the TTI) that has a (sum of weights) maximum weight (or a greater sum of weights) as compared to other eligible sets of transmit beams.

Thus, for example, in each TTI, the TD scheduler 214 may select a subset of users (subset of UEs) or flows, and a set of beams (e.g., for massive MIMO) which are passed to the FD scheduler 216 for frequency-domain resource allocation for that TTI. In 5G with massive MIMO, multiple spatial layers (e.g., multiple beams) may be transmitted simultaneously (e.g., for multi-user MIMO (MU-MIMO)). Thus, the TD scheduler 214 may determine the set of beams (and the users or UEs to assigned to those beams), and passes that information to a FD scheduler 216 for frequency-domain allocation, which may include allocating resources, such as a resource block group (RBG), to each UE for the TTI, e.g., where a RBG may include a set (or plurality) of PRBs (physical resource blocks), and wherein each PRB may include a plurality of subcarriers for one or more symbols (or time periods).

Frequency domain (FD) scheduler 216 may allocate frequency domain resources (e.g., a set of one or more frequencies, carriers, subcarriers, or physical resource blocks (PRBs)) for (or within) a TTI for transmission of data to the selected set of UEs via the selected set of beams. Thus, at TD scheduler 214 and FD scheduler 216, a set of UEs is selected and a set of beams is selected for transmission, and resources (e.g., PRBs or physical resource blocks) are allocated for transmission of data to the selected UEs via the selected set of beams.

Also, in an example embodiment, the BS may transmit to the UEs a downlink (DL) scheduling assignment (e.g., indicating the resources or PRBs assigned for transmission of data to each of the one or more selected UEs). For example, the DL scheduling assignment may be transmitted within downlink control information (DCI) that may be sent via a control channel, such as via a physical downlink control channel (PDCCH), or other control channel. Thus, scheduler 210 may allocate time-frequency resources for the transmission of the DL scheduling assignment (and/or other control information) via DCI or PDCCH. Thus, for example, scheduler 210 may also include a control channel assignment 218, e.g., to allocate time-frequency resources for transmission of the DL scheduling assignment(s). The scheduling (or tasks performed by scheduler 210) may be performed for each TTI, or for each subframe or other time period. For example, the DL scheduling assignment may identify one or more of: the UE (or provided via a radio network temporary identifier (Or C-RNTI) of the UE) that will be scheduled this TTI for downlink data transmission, the resources (e.g., the physical resource blocks (PRBs) or RBG or resource block group) assigned to each UE for downlink data transmission, and/or the beam(s) that will be used for downlink data transmission to each UE, and/or other information.

After scheduling has been performed, the BS may then transmit data during the TTI to the one or more selected UEs, via the selected resources (via the indicated PRBs or RBG(s)) and via the selected beam(s). Thus, as noted, after the scheduler 210 has scheduled the transmission of data (including selection of a set of UEs and a set of beams, and allocation of time-frequency resources) and scheduling the transmission of associated control information (such as the DL scheduling assignment), the BS may then transmit the downlink control information (also known as DCI, including the DL scheduling assignment for the transmission of the data). The BS may also transmit data to each UE via a beam(s) of the selected set of beams. The data may be transmitted on a data channel, e.g., such as a physical downlink shared channel (PDSCH), while the DCI or DL scheduling assignment may be transmitted on a same channel or a separate control channel, such as a PDCCH (physical downlink control channel), for example. The process of scheduling and transmitting data may be repeated each TTI, subframe, or other time period.

According to an example embodiment, to improve (e.g., maximize) the air interface performance, in each TTI, the transmit beams to be used for transmission by the BS may be chosen jointly in a way that maximizes a desired total metric, such as that increases (e.g., maximizes) the total (or sum) of UE metrics (e.g., the sum-PF-metric for UEs) across the chosen beams, where PF metric refers to proportionally fair metric that may attempt to provide a (proportionally) fair allocation of resources to each UE over time. PF metric may also be based on QoS or other metric that may provide more resources for a UE having a higher QoS, for example. Thus, for example, while different combinations of beams may be selected for a TTI, there may be one (or more) sets of beams that provides a total maximum beam weight (a total beam weight among the set of beams that is a greatest or maximum among possible sets of beams). Thus, in an example embodiment, the BS may select a set of beams having a maximum (or greatest total) beam weight (the total or sum of beam weights of the selected set of beams). While there are simplified heuristics that could be used to select beams sequentially (e.g., greedy methods), more complex joint-selection algorithms tend to be very complex (worst case, brute force search may be exponentially complex), and thus, time-consuming and compute intensive.

Also according to an example embodiment, to improve or maximize the air-interface performance (between BS and UE), in each TTI, the beams to be transmitted may be chosen in a way that takes into account the potential impact of interference between the chosen beams. Beams whose pointing directions are separated by a small angular separation will tend to interfere more strongly with each other, while beams whose pointing directions are separated by a larger angular separation will tend to interfere less strongly. Thus, the angular separation between the beams may be used as an indicator of the potential interference between the beams. In an example embodiment, the beams to be transmitted in a given TTI may be chosen based on the angular separation between the chosen beams. In an example embodiment, the beams may be chosen so that the angular separation between any two chosen beams is greater than a desired minimum angular separation. In an example embodiment, the beams to be transmitted in a given TTI may be chosen so that the average angular separation between the chosen beams is sufficiently large. In an example embodiment, the beams to be transmitted in a given TTI may be chosen so that for at least a certain fraction (say half, or three-fourths) of the beams, the angular separation with other beams is greater than a desired threshold. In an example embodiment, the beams to be transmitted in a given TTI may be selected so that the separation of the selected beam with the highest beam weight relative to any other selected beam is greater than a specified angular separation. In an example embodiment, a 'beam skipping distance' may be used, which may represent a measure of separation or distance, for instance a distance in an angular space, or a distance in a grid of beams. For example, in a grid of beams, a notion of distance between beams may be defined which may be based on the angular separation between the pointing directions of beams, or the spacing of beams in a grid of beams, or the indexes of the beams when the beams in the grid of beams are considered as a sequence of beams or a scanning sequence. In an example embodiment, the beams to be transmitted in a given TTI may be chosen so that the distance between any two chosen beams according to such a notion of distance is greater than a desired beam skipping distance (or greater than a minimum or desired angular separation). In an example embodiment the beams to be transmitted in a given TTI may be chosen so that the average distance between the chosen beams according to such a notion of distance is greater than a desired beam skipping distance. In an example embodiment the beams to be transmitted in a given TTI may be chosen so that the interference or overlap between the chosen beams is smaller than a desired level. Thus, the angular separation may be broadly interpreted as representing the separation between pointing directions, or a measure of the overlap or interference between beams, or a distance between beams or a beam skipping distance.

Thus, according to an example embodiment, a beam selection hardware accelerator may be used to perform one or more tasks associated with data scheduling (or as part of a data scheduler) by a node (e.g., a BS or other network node). For example, a computationally intensive task of selecting a set of beams may be offloaded from the processor (or processor core(s)) of a BS to a beam selection hardware accelerator. Both a CPU or processor (or CPU cores) may be co-located (and connected to) with the beam selection hardware accelerator on the BS, along with other components (e.g., memory, antennas, wireless transmitter/receiver, . . . ).

For example, a beam selection hardware accelerator hardware may include hardware that does not include a CPU (or Central Processing Unit or processor), and/or does not execute software or program instructions stored in (and retrieved from) memory. In an example embodiment, a beam selection hardware accelerator may be implemented using hardware, such as field programmable gate arrays (FPGAs) or other hardware solution, as an illustrative example. In other embodiments, a beam selection hardware accelerator may include hardware that itself includes a CPU or CPU cores, such as digital signal processing (DSP) cores or graphical processing units (GPU) or micro-engines, which are capable of executing programmable instructions. In an example embodiment, offloading at least a portion of beam selection to an accelerator (e.g., to the beam selection hardware accelerator) may allow scheduling to be performed in a shorter time period and/or using less power. For example, while beam selection (or one or more functions or tasks associated with beam selection) may be performed by a beam selection hardware accelerator, while other components or circuits (e.g., a processor (or CPU), or one or more processor (or CPU) cores), may perform other functions or aspects of scheduling, for example. In this manner, beam selection may be offloaded to a beam selection hardware accelerator, e.g., which may improve speed, efficiency and power consumption required for the beam selection operation.

Thus, according to an example embodiment, the beam selection hardware accelerator may perform beam selection (e.g., select a set of beams to be used for transmission for the TTI, out of a group of eligible beams), while allowing one or more (or all) of the remaining functions of the scheduler to be performed by a processor (e.g., multi-core processor) and/or one or more processor cores, for example. According to an example embodiment, a multi-core processor may include a single computing component with two or more independent processing units called cores (or processor cores), where each processing core may read and execute program instructions.

According to an example embodiment, an apparatus may include a beam selection hardware accelerator configured to determine a set of beams to be used for data scheduling by a wireless node for a transmission time interval, including being configured to: receive a beam information and information indicating an angular separation of beams for a set of selected beams; create a graph based on the beam information and the minimum angular separation; select a set of beams, out of a plurality of beams, as a maximum weight independent set of beams based on the created graph; and provide a notification of the selected set of beams.

In an example embodiment, the beam selection hardware accelerator being configured to provide a notification may include the beam selection hardware accelerator being configured to: store an indication of the selected set of beams to a shared memory; and notify a processor or processor core of the selected set of beams.

In an example embodiment, wherein the beam selection hardware accelerator being configured to select a set of beams, out of a plurality of beams, as a maximum weight independent set of beams based on the created graph may include the beam selection hardware accelerator being configured to: select a set of beams, out of one or more sets of beams that meet the angular separation of beams, that has a maximum weight, wherein the weight of a set of beams is determined as a sum of the beam weights or beam metrics associated with the beams of the set of beams.

In an example embodiment, the apparatus may further include a processor, including computer instructions, when executed by the processor core, cause the processor to: determine the beam information for the plurality of beams; determine the information indicating the angular separation (or skipping distance) for beams of the selected set of beams; and, provide the beam information and the information indicating the angular separation to the beam selection hardware accelerator.

In an example embodiment, the processor may be further configured to perform data scheduling for the transmission time interval, including being configured to: perform a selection of a subset of user devices for data scheduling in the transmission time interval; perform frequency domain scheduling to allocate frequency resources for the transmission of data to the selected subset of user devices during the transmission time interval via the selected set of beams that were selected by the beam selection hardware accelerator.

In an example embodiment, the beam information may include one or more of the following: a maximum number of layers; a maximum number of beams to be selected; a total number of the plurality of beams; a grid of beams (GOB) type indication; a beam mask indicating which of the plurality of beams may be considered to be selected; a set of beam pointing direction indicators including an indicator of a beam pointing direction for each of one or more of the plurality of beams; and a beam weight array including a beam weight or beam metric that indicates a beam scheduling priority for one or more of the plurality of beams, wherein the beam weight or beam metric for one or more of the plurality of the beams is based on one or more metrics or priorities of user devices that have identified the beam as a preferred beam.

In an example embodiment, the beam selection hardware accelerator being configured to create a graph based on the beam information and the angular separation may include the beam selection hardware accelerator being configured to perform at least one of the following: create a generalized interference graph if a grid of beams (GOB) type is a 3D (three-dimensional) GOB type; and create a circular arc graph if a GOB type is a Azimuth GOB type.

In an example embodiment, the selected set of beams may include a set of beams such that the weight (e.g., total beam weight or sum of beam weights) of the selected beam set is a maximum weight among the sets of beams in which each beam in the selected set of beams is separated from the other beams in the selected set by at least the angular separation.

Also, in an example embodiment, the beam selection hardware accelerator being configured to create a graph based on the beam information and the angular separation may include the beam selection hardware accelerator being configured to: create a graph in which each beam is represented as a vertex in the graph, and one or more pairs of vertices in the graph are connected by an edge if the beams represented by the pair of indices are less than the angular separation apart. Further illustrative examples will now be briefly described.

Also, in an example embodiment, the beam selection hardware accelerator being configured to create a graph based on the beam information and the angular separation may include the beam selection hardware accelerator being configured to: create a circular graph including: construct per-beam circular arcs on a circle, where each arc is located based on the beam's pointing direction; construct a circular arc graph, in which each vertex of the circular arc graph represents one of the arcs and an associated beam, and wherein a pair of vertices are connected by an edge if their arcs overlap, wherein two beams that are connected by an edge are less than the angular separation apart. Further example embodiments will also be described.

A BS may use beamforming, where the BS may apply a different set of antenna weights (e.g., an amplitude and phase applied to each antenna) to generate a beam (or set of beams) of a grid (or set or plurality) of beams, where each beam may cover a different area. Thus, a grid of beams (GOB) may include a set or plurality of beams, where each beam may cover a different area. For example, some (e.g., adjacent) beams may overlap, in some cases. Two illustrative examples of Grid of Beams may be used by a BS, for example. An Azimuth GOB, for example, may include a grid of beams that may be fixed in the elevation dimension, and may vary in the azimuth direction based on the set of antenna weights applied to a set of antennas at the BS. In an Azimuth GOB, for example, the pointing directions of the beams may lie in a plane or two-dimensional region, a 3D GOB (three dimensional Grid of Beams) may include a set or grid of beams, where each beam may vary in both elevation and azimuth directions based on the antenna weights applied to a set of antennas. In a 3D GOB, the pointing directions of the beams may not all lie in the same plane, and may be separated in three dimensions. For example, in a 3D GOB, the pointing directions of the beams may have different elevation angles.

According to an example embodiment, a method and apparatus are provided that may represent the relationships between beams based on an angular separation (or beam skipping distance) in the form of a graph, and performing the beam selection as a determination of a maximum-weight independent set (MWIS) based on this graph. In an example embodiment, the graph may be created as follows. The graph consists of nodes or vertices, along with edges between certain pairs of vertices. There is one node or vertex for each beam in the grid of beams. Two vertices are connected by an edge if the angular separation between the beams is smaller than a given angular separation value. In another embodiment, in the creation of the graph, two vertices are connected by an edge if the distance between the beams, according to a notion of distance among the beams, is no more than a given beam skipping distance. In another embodiment, in the creation of the graph, two vertices are connected by an edge if the overlap or interference between the corresponding beams is greater than a desired level. In some cases, the graph may be referred to as an interference graph. In an example embodiment, an independent set within the graph is a set of vertices such that there is no edge between any pair of vertices. In an embodiment, each node or vertex may have an associated weight. In an embodiment, the weight of a vertex may represent a beam metric (or beam weight) associated with the corresponding beam. In an embodiment, the weight of a set of vertices may be defined as the sum of the weights of the vertices in the set of vertices. In an embodiment, the weight of an independent set may be defined as the sum of the weights of the vertices in the independent set. In an embodiment, a maximum-weighted independent set is a set of vertices which has maximum weight among the independent sets in the graph. In an embodiment, an exact optimal solution for an MWIS within this graph may be determined, or alternatively, an approximately optimal solution for an MWIS may be determined, for example, wherein the weight of the determined set of vertices is sufficiently high even if not truly the maximum among all independent sets in the graph.

For 3D GOB, the creation of such a graph may result in a generalized interference graph. In some embodiments with large number of beams, the graph may be a sparse graph (each vertex is connected to relatively few other vertices). Finding the optimal solution of MWIS on arbitrary or generalized graphs may be NP-hard; but heuristic solutions may be used, for example, for approximating an MWIS, especially since the graph is likely to be sparse. For example, NP-hardness (non-deterministic polynomial-time hardness), in computational complexity theory, may be the defining property of a class of problems that are, informally, at least as hard as the hardest problems in NP. For a generalized interference graph in a 3D GOB, in some embodiments, an approximate solution may be determined using a heuristic algorithm which works efficiently when the graph is sparse.

In some embodiments, for Azimuth GOB, a technique may be used in which the beam relationships can be transformed into a specific type of graph known as a circular arc graph. Then, based on this transformation, or based on this circular arc graph, a set of beams may be selected via a technique, such as MWIS. The determination of an MWIS in a circular arc graph may be performed as an optimal MWIS, or as an approximate MWIS. Further details of such embodiments are described in the following.

In some cases, the execution time of such beam selection algorithms (e.g., using MWIS or other algorithm) on low-power CPU cores (such as the ARM cores) may be too high. However, according to an example embodiment, beam selection algorithm(s) may be suitable for implementing in hardware acceleration blocks, e.g., such as programmable FPGAs, dedicated accelerators (on-chip or off-chip) or graph processors, as some examples.

Thus, according to an example embodiment, a beam selection hardware accelerator (which may also be referred to as a hardware beam selection accelerator) may be provided to perform beam selection for a data scheduler. A system may be provided that includes a beam selection hardware accelerator to perform beam selection for a data scheduler, and a processor (e.g., CPU) or processor core(s) that may perform one or more additional functions or tasks for scheduling. Also, according to a further example embodiment, an interface(s) may be provided between the processor and the beam selection hardware accelerator. According to an example embodiment, such a system may perform, for example, one or more of:

1) Using the interface, a CPU core provides the relevant beam information and other parameter(s) (e.g., an angular separation between beams for a selected set of beams, which may represent a desired separation between pointing directions of the selected beams, or a distance between selected beams, or a level of interference or overlap between selected beams, or the like) to the beam selection hardware accelerator. The beam selection hardware accelerator may determine or create a graph based on the beam information and angular separation for beams. The beam selection hardware accelerator may then select a set of beams (e.g., as a MWIS set of beams), out of a plurality of beams, based on the graph. A different type of graph may be created for different types of GOBs (e.g., for 3D GOB, or azimuth GOB).

2) For example, for Azimuth GOB, the beam selection hardware accelerator may transform the beam information into a circular arc graph representation, or create a suitable graph such as a circular arc graph.

3) For example, the beam selection hardware accelerator identifies or selects a set of beams (e.g., a MWIS set of beams) from (or based on) this graph, e.g., using any suitable method for finding an optimal MWIS on circular arc graphs for Azimuth GOB, and using any suitable heuristic for approximating MWIS for 3D GOB.

4) The beam selection hardware accelerator may notify the processor (or processor core) of the selected set of beams. The processor (or core) may then perform data scheduling for the TTI based on the selected set of beams.

An example embodiment may include one or more of the following:

A hardware accelerator (a beam selection hardware accelerator) for wireless MAC scheduler may:

1) Receive as input, beam information (or one or more beam-related parameters), such as, for example:
  A number of layers L.
  A number of beams B (a total number of beams).
  A "GOB type" indicator T—e.g., ("0" for Azimuth GOB, or "1" for 3D GOB).
  A beam mask m (of length B) indicating which of the B beams are allowed to be considered.
  An array A (length B) containing the directions (e.g., angles) in which the beams point, A[0] ... A[B−1]. For Azimuth GOB, each angle is a single number θ, while for 3D GOB, each angle is a 2-tuple (θ, φ).
  An array M (length B) containing the beam metrics (or beam weights) of the beams, M[0] ... M[B−1].

Also, the beam selection hardware accelerator may also receive as an input, an angular separation (Ad) between beams (which may also be referred to as a beam skipping distance). For example, any beams whose pointing directions are separated by less than Ad should not be jointly selected, or, e.g., these two beams should not both be part of the selected set of beams to be used for data scheduling for a TTI, e.g., because such beams, which are not separated by the angular separation (Ad), may interfere too strongly with each other. Thus, for example, the beams of the selected set of beams should be a set of non-interfering beams (e.g., each beam separated (or spaced), from the other beams of the selected set of beams, by at least the minimum angular threshold, Ad).

2) After receiving these inputs, the beam selection hardware accelerator may perform the following tasks, by way of example:
  Create or determine a graph based on these inputs, and then, based on this graph, select a set of beams. For example:
  If GOB type is "Azimuth GOB", the beam selection hardware accelerator creates a circular arc graph representation G based on the input information about the beams (details in the following).
  If GOB type is "3D GOB", the beam selection hardware accelerator creates a representation of this information (and these beams) as an arbitrary graph G.
  If L>=B, the beam selection hardware accelerator determines or selects a maximum-weight independent set (MWIS) of beams based on the circular-arc graph G. Or if L<B, among all independent sets of size <=L in G, the beam selection hardware accelerator determines a MWIS set of beams having a maximum-weight.

3) The beam selection hardware accelerator may provide information to the processor or processor (or CPU) core indicating the selected set of beams. For example, the beam selection hardware accelerator may store or write information (e.g., via beam mask or other information) to a shared memory (that is accessible by both beam selection hardware accelerator and the processor) identifying the selected set of beams.

Figure 3:
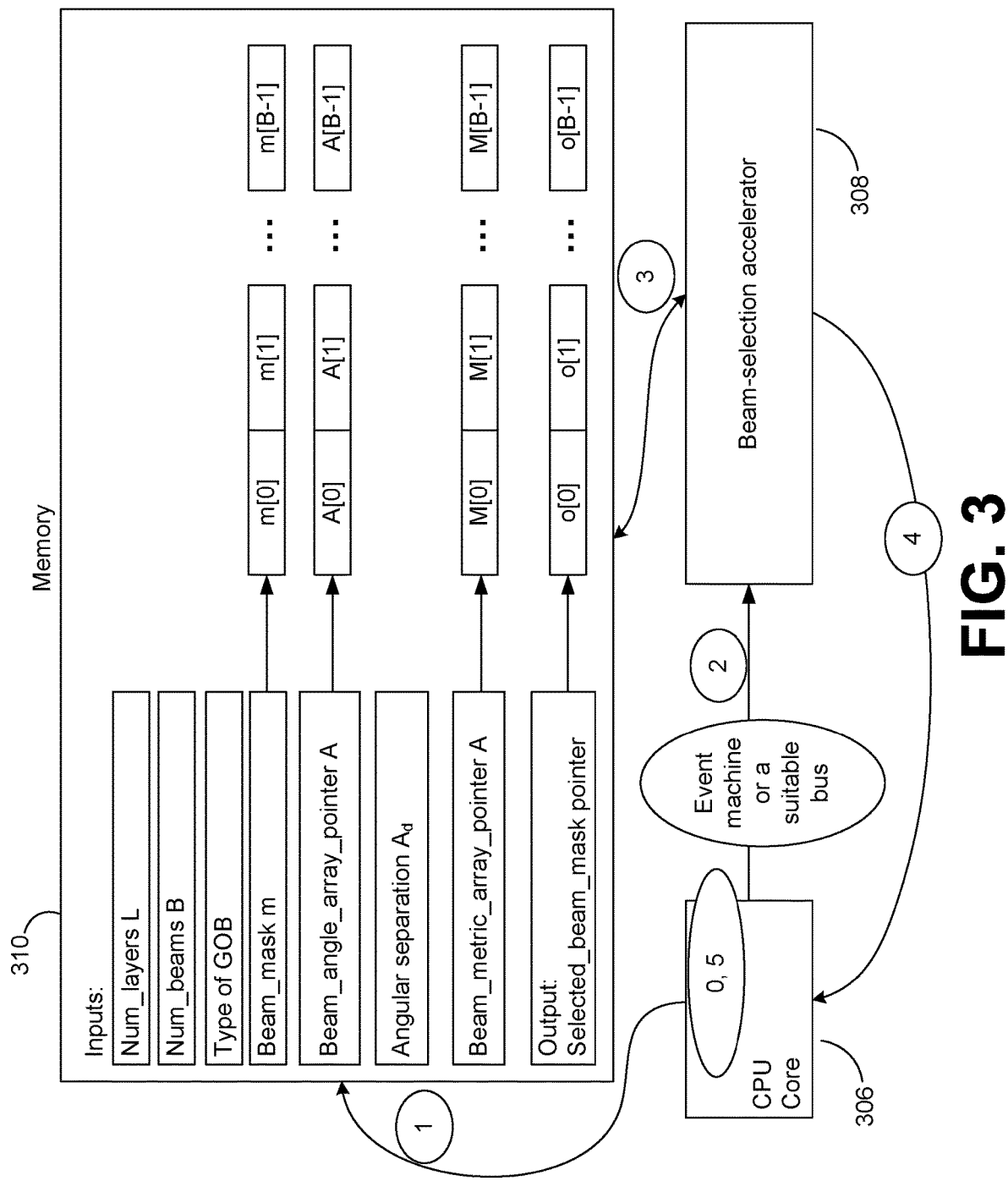
FIG. 3 is a diagram illustrating a technique of communicating between a processor (or CPU core or processor core) and a beam selection hardware accelerator according to an example embodiment.

FIG. 3 is a diagram illustrating a technique of communicating between a processor (or CPU core or processor core) in charge of executing frequency-domain scheduling and a beam selection hardware accelerator according to an example embodiment. A processor 306 (which may perform frequency domain scheduling or other aspects of scheduling), may be in communication (e.g., either directly, or indirectly via a bus or other communication technique or via a shared memory 310) with a beam selection hardware accelerator 308. Also, both processor 306 and the beam selection hardware accelerator 308 may both have access to write to and read from a shared memory 310, for example.

As shown in FIG. 3, operations 0-5 may be performed, including:

0. CPU core selects a TTI k for which scheduling and beam selection needs to be performed.

1. Processor 306 (or a CPU core) may determine or receive inputs (which are to be provided to the beam selection hardware accelerator 308), e.g., including one or more of: (i) a number of allowed layers (L), (ii) a number of total beams (B) (iii) an indicator or beam mask (m) identifying the allowed beams that may be considered for selection (iv) an array (A) of beam pointing directions (angles of each beam), (v) an array of beam weights (or beam metrics) (M), and (vi) a minimum angular separation (Ad); and/or other inputs.

2. Processor (or CPU core) 306 passes these input parameters to the beam selection hardware accelerator 308. For example, processor 306 may write or store these input parameters to memory 310 that may also be accessed by beam selection hardware accelerator 308.

3. Beam selection hardware accelerator 308 retrieves (e.g., reads) from memory 310 the input parameters, and creates a graph based on the input parameters, and then determines a maximum weight independent set of beams based on the graph. For example, beam selection hardware accelerator 308 may create a circular arc graph for the beams if GOB type is Azimuth GOB, and a generalized interference graph if the GOB type is a 3D GOB, and finds a maximum-weight independent set (MWIS) of beams in the graph (e.g., restricted to size L).

4. Beam selection hardware accelerator 308 may write or store information in memory indicating (or identifying) the selected set of beams (e.g., as an array, or a selected beam mask (o)). Beam selection hardware accelerator 308 may provide a notification to the processor (or CPU core) 306 that the beam selection task is complete. This notification may be provided as an event in an event machine queue, or via a bus provided between the processor 306 and beam selection hardware accelerator 308, or via other communication or notification mechanism.

5. Processor 306 may read or retrieve from memory 310 the information indicating the selected set of beams, and may use this selected set of beams to perform data scheduling for a set of UEs.

Figure 4:
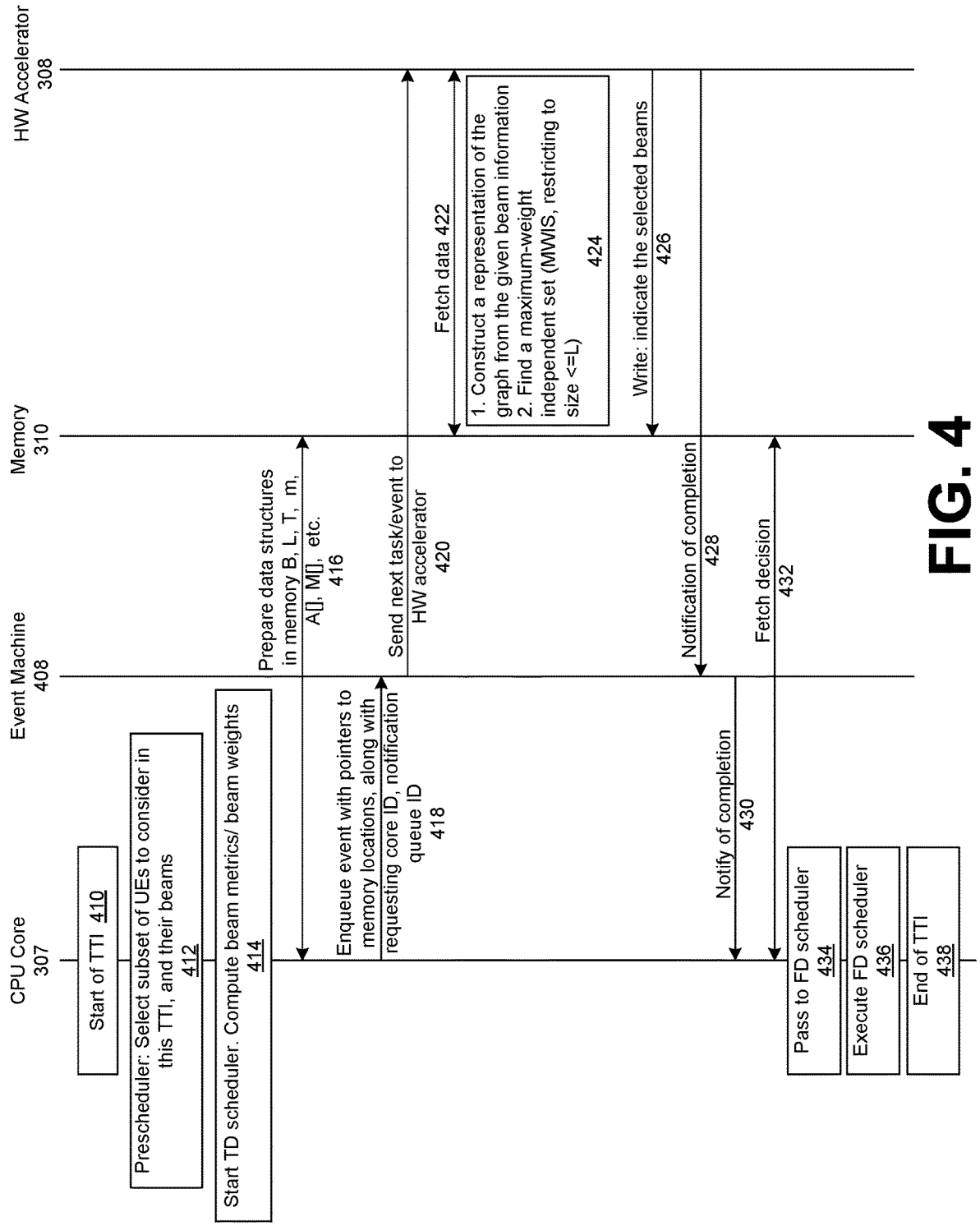
FIG. 4 is a diagram illustrating a message flow between a processor and a beam selection hardware accelerator according to an example embodiment.

FIG. 4 is a diagram illustrating a message flow between a processor and a beam selection hardware accelerator according to an example embodiment.

A CPU core 307 is shown, but may include single CPU core, or a multi-core CPU or processor, where multiple cores may feed into (or be connected to) the same beam selection hardware accelerator 308 in parallel. An event machine 408 may also be provided to facilitate or provide communication between the processor or CPU core 307 and the beam selection hardware accelerator 308 (although other techniques or communication mechanisms may be used). Event machine 408 may, for example, provide an event-driven input/output between blocks or functional entities, e.g., to allow CPU core 307 and beam selection hardware accelerator 308 to communicate and/or pass information between each other. For example, event machine 408 may assist in dispatching the tasks (such as a beam selection task) to the beam selection hardware accelerator 308, and returning the beam selection results (information indicating the selected set of beams) from the beam selection hardware accelerator 308 back to the CPU core 307.

Referring to FIG. 4, 410 indicates the start of the TTI (or start of processing for a TTI). At 412, a prescheduler may select a subset of UEs (and their best or preferred beams) to be considered for selection. At 414, the time domain scheduler is started, and beam weights (which may also be known as beam metrics) are determined or computed. At 416, the inputs for a beam selection task are determined and stored in memory 310 (FIG. 3), including, e.g., one or more of: B (number of total beams), L (a number of layers), T (GOB type, e.g., indicating either azimuth or 3D GOB type), m (a beam mask indicating which of the B beams may be considered for this TTI), A[ ] (the beam angle array, including the angles or directions that each beam points), M[ ] (including the beam weights or beam metrics), Ad (minimum angular separation between beams of a selected set of beams so as to avoid interference between beams of the selected set of beams), . . . . According to an example embodiment, the beam angle array A[ ], which may be in sorted order, may be constructed or determined once (and may not necessarily need to be determined each TTI). Also, according to an example embodiment, the beam mask m may be updated every TTI, based on the users/UEs selected by the pre-scheduler, for example.

At 418, CPU core 307 enqueues the event (stores in a queue or memory, a request to perform beam selection) with pointers to memory locations of the inputs (or data structures), along with request core ID and notification queue ID. At 420, the event machine receives and forwards the event information (e.g., event notification, and pointers to memory for inputs) to the beam selection hardware accelerator 308. In an example embodiment, to help the event machine 408 to route the response (beam selection results) back to the correct requesting CPU core, the CPU core 307 can include a core ID (that identifies the core), an event machine queue ID, along with the event (a request for beam selection, providing the input parameters) sent to the beam selection hardware accelerator 308.

At 422, beam selection hardware accelerator 308 retrieves or fetches the inputs or data structures from memory 310, e.g., based on the pointer(s) to such inputs or data structures. At 424, beam selection hardware accelerator 308 creates a graph based on the inputs, and determines or calculates a maximum weight independent set (MWIS) set of beams. At 426, beam selection hardware accelerator 308 writes or stores the beam selection results (e.g., information indicating the selected set of beams) to memory 310. When the beam selection hardware accelerator 308 completes the beam selection task or job, it may enqueue (e.g., store or write) the completion notification event into the correct EM (event machine) queue and include the requesting core ID in the event. The event machine 408 can dispatch the response back to the correct core that requested that event.

At 428, beam selection hardware accelerator 308 provides a notification to event machine 408 that the beam selection task has been completed. At 430, the event machine 408 provides CPU core 307 with a notification that the beam selection task has been completed. At 432, the CPU core 307 retrieves or reads, from memory 310, information identifying the selected set of beams. At 434, CPU core 307 passes or sends this information identifying the selected set of beams to the frequency domain scheduler. The FD scheduler, or the scheduler (e.g., which may be implemented as software or code executed by the CPU core or processor) may then perform scheduling based on the selected set of beams and other information. The end of the TTI is indicated at 438. This process, by way of illustrative example, may be repeated for each TTI, for example.

Figure 5:
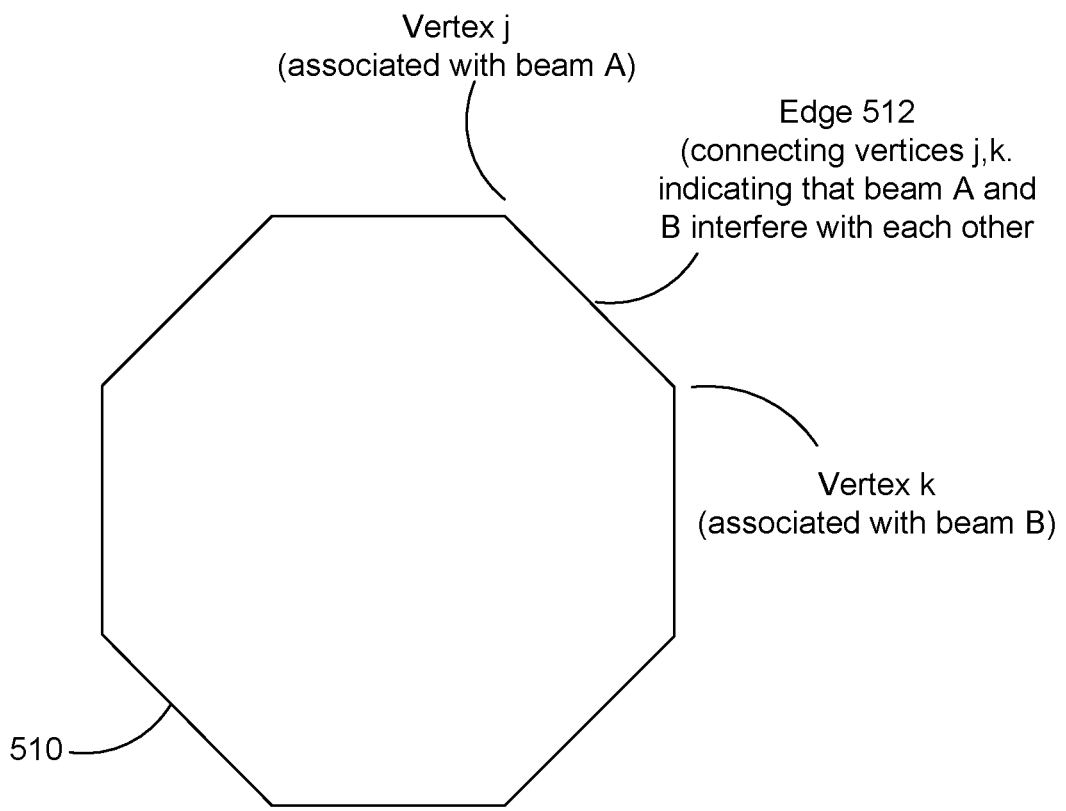
FIG. 5 is a diagram illustrating examples of a graph that may be created to represent beams according to an example embodiment.
Figure 5:
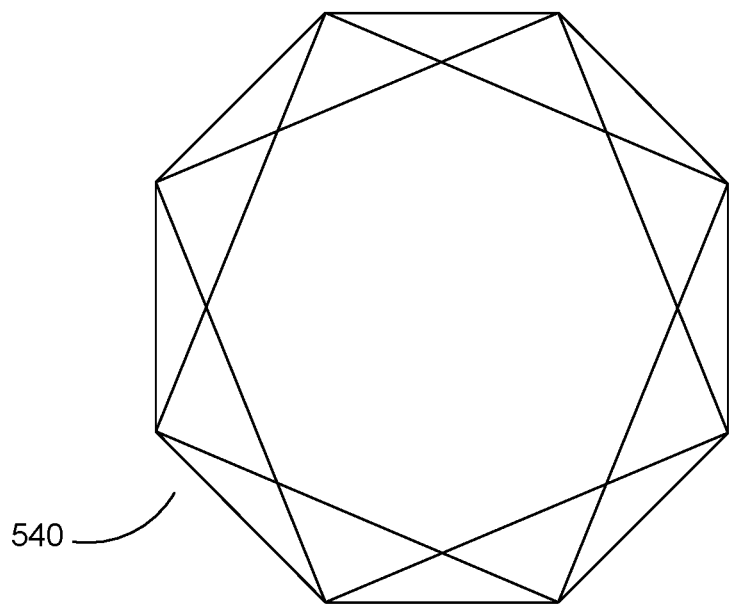

FIG. 5 is a diagram illustrating examples of a graph that may be created to represent beams according to an example embodiment. Graphs 510 and 540 are shown.

Graph representation For 3D GOB with beam skipping distance (minimum angular separation), Ad:

For any GOB with a minimum angular separation (which may also be referred to as a beam skipping distance) Ad, a weighted beam-graph 510 may be created, for example:

As shown in FIG. 5, graph 510 shows a graph with 8 vertices (each vertex representing a beam). This graph represents relationships between beams in a grid of 8 beams, which are equi-spaced (i.e., their pointing directions are roughly equally spaced in angular separation), and an angular separation (or beam skipping distance) Ad of 1 is desired. That is, beams that are adjacent in the grid of beams may strongly interfere with each other and thus should not be chosen together when selecting beams for transmission in a TTI.) Thus, each beam is (represented in the graph 510 as) a vertex. Vertexes (vertices) j, k are connected by an edge in the graph if distance $(j,k) <= Ad$. For example, in this graph, two vertices (each vertex representing an associated beam) are connected by an edge if the angular separation between the two beams does not meet the angular separation requirement (thus, indicating that these two beams interfere with each other and cannot both be part of the selected set of beams). Thus, as shown by graph 510, vertex j (e.g., representing or associated with beam A) and vertex k (representing or associated with beam B) are connected by edge 512, which indicates that beams A and B are less than the minimum angular distance apart, and thus, beams A and B interfere with each other and should not both be part of a selected set of beams for scheduling (because beams of the selected set should have at least the minimum angular separation (also known as beam skipping distance), Ad, between them, to avoid beam interference when transmitted at the same time. Other vertices (vertexes) are shown with edges that connect some vertices.

A more complicated graph(s) is shown as graph 540. Graph 540 also represents a grid of 8 beams as in FIG. 510. However, not only do adjacent beams strongly interfere with each other (as in FIG. 510), but beams that are two (e.g., two beam spaces) apart (or less) in the grid also may strongly interfere. Thus, while FIG. 510 used Ad=1, FIG. 540 uses Ad=2. Thus when the graph is created, a vertex (representing a beam) is connected not only to its immediately adjacent vertex by an edge, but also to a vertex that is the next one beyond the immediately adjacent vertex.

A weight (e.g., beam weight) may be assigned to each vertex k of this sub-graph, W(k)=the provided metric of the beam M[k]. For example, based on the PF metric (a UE metric, which may be a proportionally fair metric, or other UE metric) of users/UEs on the beam. In each TTI, a weighted graph may be created or determined, given by the beam mask, representing the beams that are to be considered in for TTI, and assigning weights to each vertex based on the beam weights.

According to an example embodiment, only feasible (e.g., non-interfering) sets of beams within which each beam is separated from all other beams by at least the angular distance Ad (or beam skipping distance) can be selected. Thus, according to an example embodiment, to avoid beam interference, each feasible set of beams is an independent set in this graph (e.g., where no two vertices (associated with the selected set of beams) are connected by an edge).

Thus the beam selection problem in a grid of 8 beams with Ad=1 can be transformed into a problem of finding a maximum-weight independent set (MWIS) in the graph 510, shown in FIG. 5.

If the number of layers restricted to L, then among independent sets of size <=L, we need to find the max-weighted set, where the size of a set refers to the number of vertices in the set.

For generalized graphs, the MWIS problem is NP-hard. However, heuristics are known for approximately solving this in a generalized graph.

Once the graph is constructed as above, the beam selection hardware accelerator uses any suitable algorithm to find or approximate an MWIS for the graph. For example, the graph may be sparse—e.g., where each vertex is connected to only a few "nearby" vertices within the beam skipping distance (within maximum angular separation, Ad), and a suitable approximation can be used that works efficiently for graphs where a degree of each node is limited to a certain number. The degree of a node or vertex refers to the number of other nodes to which that node is connected by edges. In a sparse graph, the degrees of most nodes will be small, and efficient algorithms or heuristics can be used to find approximate solutions for MWIS on such sparse graphs, for example when the maximum degree of a node is bounded by a given number.

Figure 6:
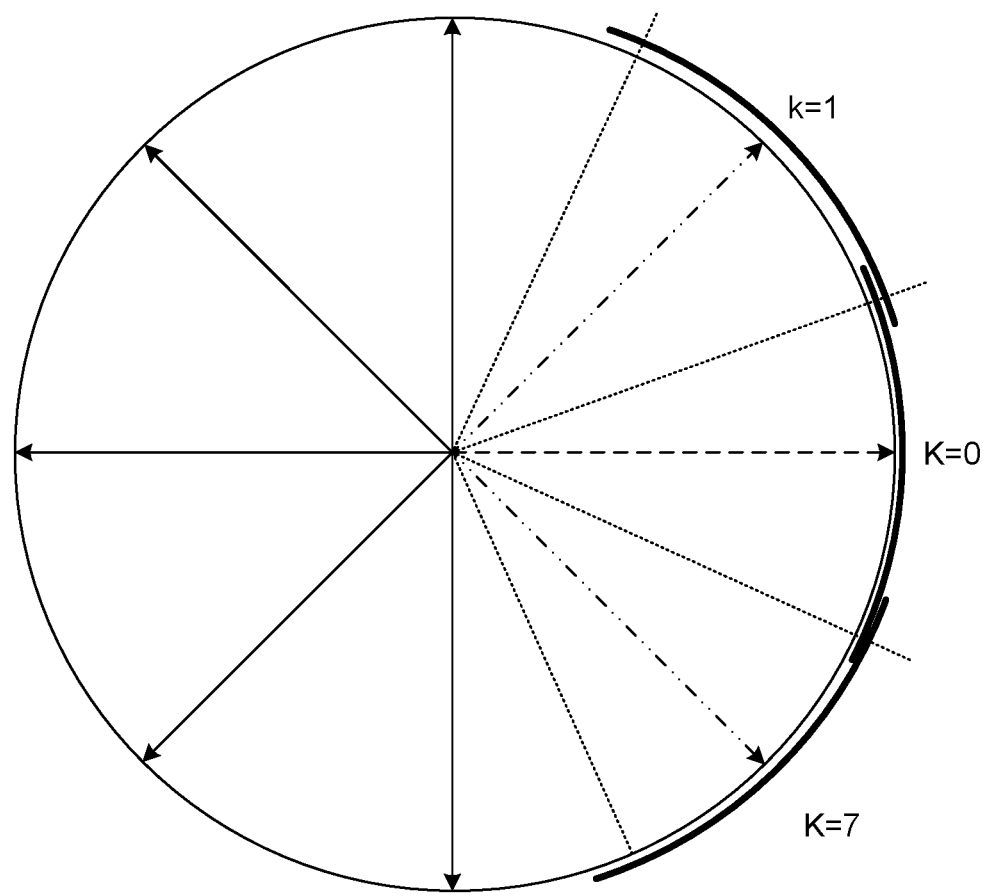
FIG. 6 is a diagram illustrating a circular arc graph for azimuth grid of beams (GOB) according to an example embodiment.

FIG. 6 is a diagram illustrating the creation of a graph for azimuth grid of beams (GOB) according to an example embodiment. For Azimuth GOB, in this embodiment, for a Beam graph with beam skipping or a desired angular separation, a specific type of graph called a circular arc graph is created. The connections between vertices in the beam-graph for an Azimuth GOB is equivalent to the overlap relationships between a set of circular arcs, by a construction described in the example shown in FIG. 6.

Notation: (All angles are modulo 360 degrees (or $2\pi$, if unit is radians). Given B Azimuth beams with boresight directions pointing towards angles A[0], . . . , A[B−1]. Assume without loss of generality that A[0], . . . A[B−1] are sorted in increasing order of pointing angle. Also, a desired angular separation between the selected beams (i.e., "beam skipping distance") is Ad. The circular arc graph is constructed as follows. Each beam is first represented by an arc on a circle (for example, a circle of radius 1), centered at the pointing direction of the beam. The angular width of the circular arc is related to the desired angular separation Ad, and is chosen so that the circular arcs of two beams do not overlap only if the two beams are separated by greater than the desired angular separation Ad (or beam skipping distance).

Construction of Per-beam circular arcs: for beam k, construct circular arc k as the circular arc on the unit circle spanning angular range $[A[k]-A_d-\varepsilon, A[k]+A_d+\varepsilon]$, where $\varepsilon$ is chosen as any number between 0 and min(abs(A[(k+1) modulo B]−A[k])/2), where min( ) is over k=0 . . . B−1, and abs( ) is the absolute value. The angular width of the arc of any beam k is thus 2*(Ad+$\varepsilon$). This way of selecting the width of the arc ensures that the arcs of two beams do not overlap only if the two beams are separated by greater than the desired angular separation Ad (or beam skipping distance). It should be noted that these values of the widths of the arcs corresponding to each beam are examples only, and other values may be used. For example, the circular arcs for different beams may be chosen to have different widths rather than equal widths as in the above example, depending on the spacing between the beams in the set of beams. Alternatively, the circular arc for a given beam may not be symmetrically centered around a representative pointing angle of the beam, but rather may be longer on one side than on the other side. Other alternative constructions are also possible.

Construction of Circular arc graph representing the overlaps of these arcs: Each vertex represents an arc (which in turn represents a beam). Any two vertices j and k are connected by an edge if their corresponding arcs overlap. Each vertex k is associated with beam weight=M[k], the beam weight (or beam metric) of beam k. Since we ensure that the angles in array A[ ] may, for example, already be sorted when provided to the beam selection hardware accelerator 308, a further simplification of the creation of the circular arc graph can be made that is useful in some of the algorithms for MWIS: each circular arc k is represented by a pair of points (hk, tk) (head and tail of arc k). Since the arcs are all of equal length, and hk are pre-sorted already, a full ordering of all arc endpoints hk/tk can also be constructed easily. This fully ordered list of hk/tk is used in some embodiments in the algorithms for finding the MWIS on circular arc graph. In some embodiments, for finding MWIS, a similar representation called an interval graph can be used.

As shown in FIG. 6, the circular arc graph shown in FIG. 6 shows some circular arcs for B=8 beams, arrows represent the pointing directions (or angles) of beams of the grid of beams (GOB). The 8 beams in this example are equi-spaced, together covering 360 degrees. In this illustrative example, the desired angular separation (or beam skipping distance), Ad, is 45 degrees. Thus, if a beam is chosen (e.g., a black beam with k=0), its immediate (adjacent) neighbor beams should be skipped (e.g., beams with K=1 and k=7) because such adjacent beams would not be the minimum angular separation or beam skipping distance (Ad) apart. For example, the creation of the circular arc graph described above may ensure that the arc for beam k=0 overlaps with the arcs for adjacent beams k=1 and k=7, thus indicating that such adjacent beam pairs (both beams or arcs for the adjacent pair of arcs for k=0 and k=1 should not be selected; and/or both beams or arcs for the adjacent pair of arcs for k=0 and k=7) should not be selected as part of the selected set of beams due to interference between adjacent arcs or associated beams, as shown in this illustrative example.

According to an example embodiment, once the graph representation is constructed, the beam selector can find an MWIS for the graph as follows, by way of illustrative example:

For 3D GOB, wherein the created graph is a generalized interference graph that is likely sparse. The Beam selection accelerator can use any suitable algorithm or heuristic for finding or approximating an MWIS in the graph, such as one of the following, for example: A. Kako, T. Ono, T. Hirata, M. Halldorsson, "Approximation algorithms for the weighted independent set problem in sparse graphs", Discrete Applied Mathematics, 2009. S. Sanghavi, D. Shah, A. Willsky, "Message passing for maximum weight independent set", IEEE Transactions on Information Theory, 2009. Others may be used as well.

For Azimuth GOB, wherein a circular arc graph can be created: Once the circular arc graph is constructed, the beam selection accelerator to find the MWIS on a circular-arc graph, any suitable solution can be used, such as the following: Y. D. Liang, S. K. Dhall, S. Laxmivarahan, "On the problem of finding all maximum weight independent sets in interval and circular-arc graphs", 1991. G. Valiente, "A new algorithm for the maximum weight independent set problem on circle graphs", 2003.

Thus, a number of different techniques or algorithms may be used by the beam selection hardware accelerator, e.g., after the appropriate graph representation of the beams is constructed, for finding a maximum weighted independent set. Also, in some cases, performance may be improved, e.g., by restricting the chosen set size to L as provided in the input. The selected set may be an exact or optimal maximum-weighted independent set, or an approximation thereof.

Figure 7:
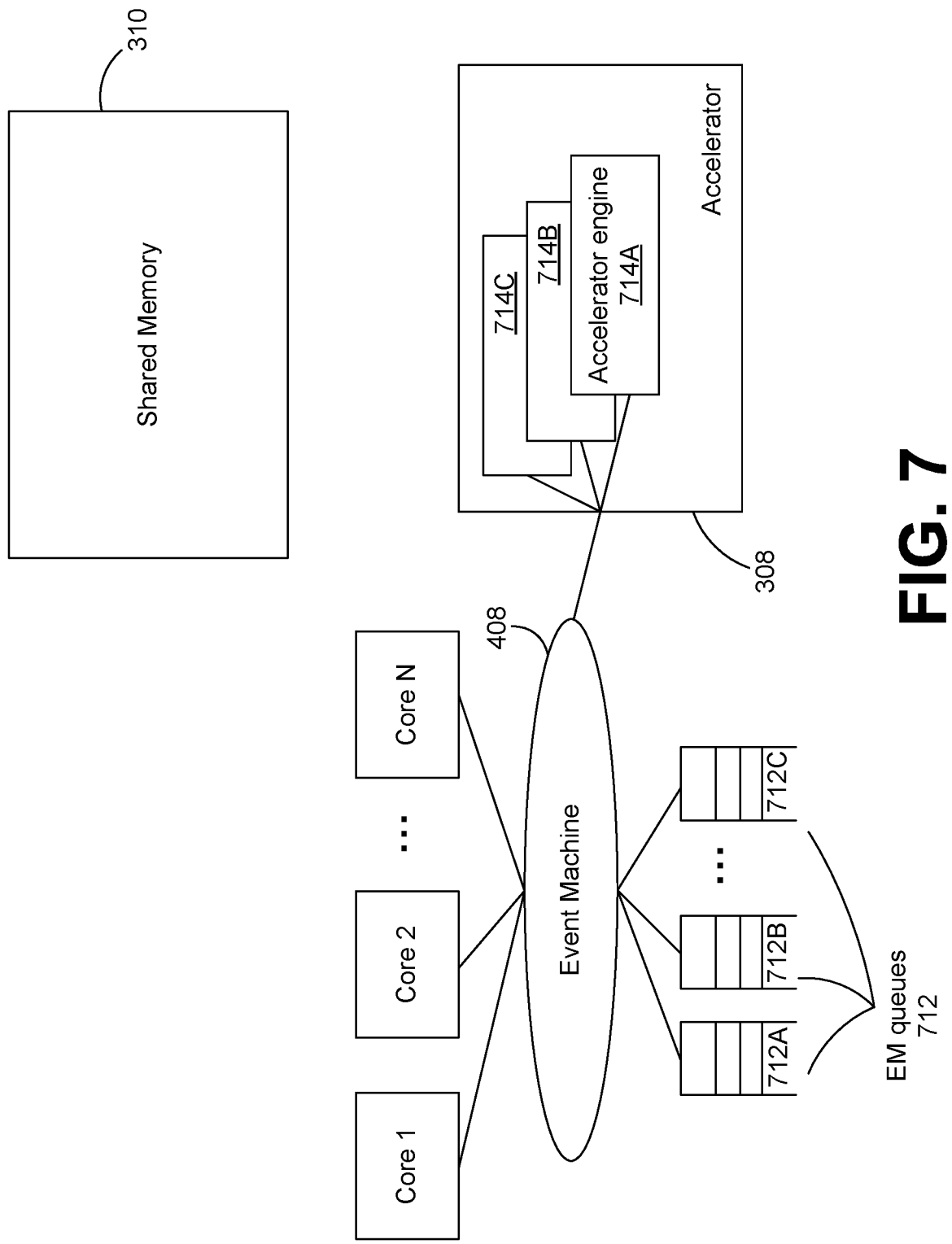
FIG. 7 is a block diagram of a system according to an example embodiment.

FIG. 7 is a block diagram of a system according to an example embodiment. The system in FIG. 7 may be used for an event machine-based communication between CPU cores (core 1, core 2, . . . core N) and a beam selection hardware accelerator 308. The system shown in FIG. 7 may include a shared memory 310, one or more CPU or processor cores (e.g., core 1, core 2, . . . core N), a beam selection hardware accelerator 308, one or more EM (event machine) queues 712 (e.g., including EM queues 712A, 712B, 712C, . . . ). According to an example embodiment, a scheduler runs on (or is performed by) a CPU core(s). Thus, for example, each core runs a scheduler task for a separate cell, or the scheduler task of one cell itself may be parallelized and run on multiple processor cores simultaneously. Beam selection hardware accelerator 308 may include multiple accelerator engines (e.g., accelerator engines 714A, 714B, 714C, . . . , which may each perform a specific task associated with scheduling, such as selecting a set of beams, or other task). For example, multiple acceleration engines may allow multiple tasks associated with scheduling for one cell to be performed in parallel, or may allow a beam selection task (selection of a set of beams as a MWIS set of beams) to be performed in parallel for each of multiple cells.

CPU cores and the accelerator engines 714A, 714B, and 714C are all connected by an event machine (EM) 408. CPU cores can send events or tasks (e.g., such as a request to select a set of beams) to a queue 712 (or one of queues 712A, 712B, 712C) which can be dispatched to all (or selected) accelerator engines 714A, 714B, 714C, etc. Accelerator engines can send events (e.g., beam selection results) to a queue which can dispatch them to CPU core(s). When a job (or event or task) is issued by a particular processor core to the accelerator, the response from the accelerator may be sent back to a particular core (either the same core that originated the job, or a specified "next" core). To help the event machine 408 to route the response back to the correct requesting core, the requesting CPU core may include a "reply-to" address—e.g. a core ID and an event machine queue ID along with the event. When the accelerator 308 (e.g., a specific accelerator engine) completes the job, it will enqueue the completion notification event into the correct "reply-to" queue and include the "reply-to" core ID in the event. In this manner, event machine 408 can dispatch (or store or write or provide) the response (e.g., the results of the beam selection) to the correct processor core.

Figure 8:
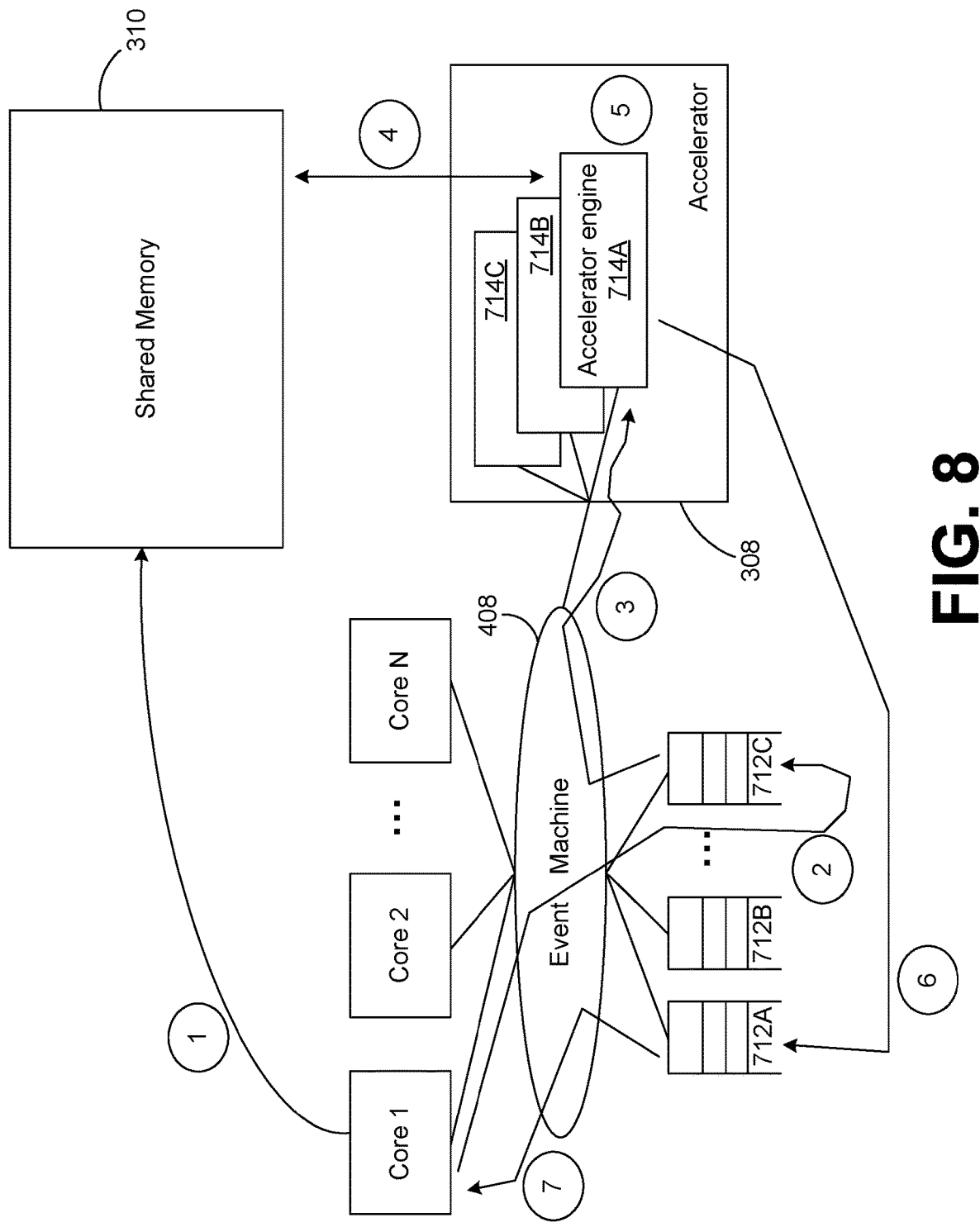
FIG. 8 is a diagram illustrating an operation of the system of FIG. 7 according to an example embodiment.

FIG. 8 is a diagram illustrating an operation of the system of FIG. 7 according to an example embodiment.

1. Scheduler on a CPU core creates and stores (writes) appropriate data structures (inputs for the accelerator 308) to a shared memory 310 with parameters of the task to be accelerated (e.g., inputs or parameters for the beam selection task).

2. Scheduler task on CPU core 1 creates an event containing an indication of the memory location and a "reply-to" address (core ID for core 1 and a queue ID for queue 712A in this example), and enqueues (or stores) the event in a specific queue (e.g., queue 712C).

3. An event from the queue is dispatched to (one of) the accelerator engine(s), e.g., to accelerator engine 714A.

4. Accelerator engine 714A fetches the required information (inputs or data structures for the beam selection task) from the indicated memory location in memory 310.

5. Accelerator engine 714A processes the job (e.g., selects a set of beams based on the inputs) and writes the output result to a location in memory 310.

6. Accelerator engine 714A enqueues a response event back to the "reply-to" queue ID (e.g., back to reply to queue 712A).

7. Event Machine 408 dispatches the response event to the "reply to" core ID (e.g., back to processor core 1).

Further example generalizations that may apply. Event machine is shown for communication between CPU core and accelerator, but any other method can be used. In principle, multiple processor cores may feed tasks or events to the same accelerator or accelerator engine in parallel (e.g., each processor core may process or perform scheduling for a different cell, or may dispatch or send an event for beam selection to one or different accelerators or accelerator engines).

To help the event machine to route the response back to the correct requesting core, the CPU core can include a core ID and an event machine queue ID along with the event sent to the accelerator (or accelerator engine). When the accelerator (or accelerator engine) completes the job, it will enqueue (or store in a queue) the completion notification event into the correct EM queue and include the requesting core ID in the event. The EM 408 can dispatch the response back to the correct processor core that requested that event (e.g., back to the processor core that requested the beam selection).

The example in FIG. 8 shows an accelerator 308 (or an accelerator engine) processing one job/event at a time. But the accelerator 308 (e.g., including multiple accelerator engines) may be capable of processing multiple jobs simultaneously (e.g. sent from multiple CPU cores)—e.g., beam selection hardware accelerator 308 may be configured to have parallel circuitry (e.g., multiple accelerator engines, that may run in parallel) to execute multiple tasks simultaneously, for example. Also, each accelerator engine may also process multiple tasks in parallel. The beam selection hardware accelerator 308 may read multiple jobs in one batch from the event machine 408 in this case.

While much of the above description has centered on beam selection for transmission on the downlink (from BS to UE), it should be understood that it is equally applicable for beam selection or reception on the uplink (from UE to BS). On the uplink, receive beamforming at the BS provides similar gains to the received signal level as transmit beamforming for the transmitted signal level on the downlink. On the uplink, multiple beams can be simultaneously selected, in order to receive the transmissions of different users. The embodiments described apply for the uplink in a similar manner as for the downlink.

Some example technical advantages or technical benefits may include:

Offload compute-heavy tasks from CPU core to an accelerator (e.g., beams selection hardware accelerator 308)— e.g., to speed up execution time (shorter execution time) of the task (e.g., due to being offloaded to a specific accelerator to perform this task), and/or possibly at lower power than a CPU or core could perform the task.

One or more aspects or example embodiments may be beneficial for 5G where Scheduler work expands due to massive MIMO, and time to perform scheduling tasks may be reduced due to smaller TTI durations.

Embodiment 1

Figure 9:
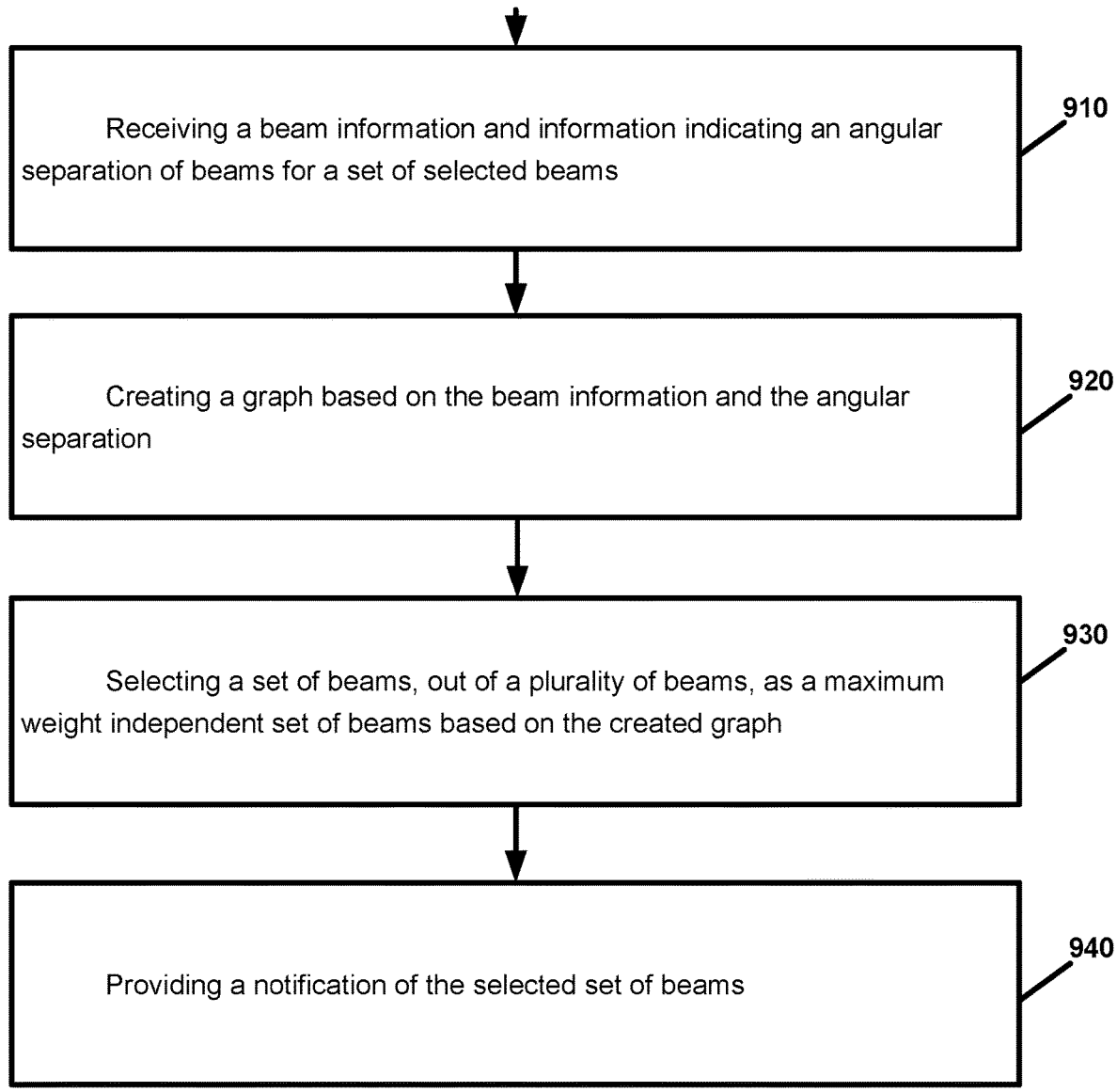
FIG. 9 is a flow chart illustrating operation of a system according to an example embodiment.

FIG. 9 is a flow chart illustrating operation of a system according to an example embodiment. The method illustrated in the flow chart of FIG. 9 may include, for example, a method of determining a set of beams to be used for data scheduling by a wireless node for a transmission time interval, the method performed by a beam selection hardware accelerator. Operation 910 includes receiving a beam information and information indicating an angular separation of beams for a set of selected beams. Operation 920 includes creating a graph based on the beam information and the angular separation. Operation 930 includes selecting a set of beams, out of a plurality of beams, as a maximum weight independent set of beams based on the created graph. And, operation 940 includes providing a notification of the selected set of beams.

Embodiment 2

The method of embodiment 2 and further comprising: performing the following by a processor or processor core, based on executing computer instructions stored in memory: determine the beam information for the plurality of beams; determine the information indicating the minimum angular separation for beams of the selected set of beams; and, provide the beam information and the information indicating the minimum angular separation to the beam selection hardware accelerator.

Embodiment 3

An apparatus comprising means for performing the method of any of embodiments 1-2.

Embodiment 4

An apparatus comprising at least one processor and at least one memory including computer instructions that, when executed by the at least one processor, cause the apparatus to perform the method of any of embodiments 1-2.

Embodiment 5

An apparatus comprising a computer program product including a non-transitory computer-readable storage medium and storing executable code that, when executed by at least one data processing apparatus, is configured to cause the at least one data processing apparatus to perform the method of any of embodiments 1-2.

Embodiment 6

An apparatus comprising: a beam selection hardware accelerator configured to determine a set of beams to be used for data scheduling by a wireless node for a transmission time interval, including being configured to: receive a beam information and information indicating an angular separation of beams for a set of selected beams; create a graph based on the beam information and the angular separation; select a set of beams, out of a plurality of beams, as a maximum weight independent set of beams based on the created graph; and provide a notification of the selected set of beams.

Embodiment 7

The apparatus of embodiments 6, wherein the beam selection hardware accelerator being configured to provide a notification comprises the beam selection hardware accelerator being configured to: store an indication of the selected set of beams to a shared memory; and notify a processor or processor core of the selected set of beams.

Embodiment 8

The apparatus of any of embodiments 6-7, wherein the beam selection hardware accelerator being configured to select a set of beams, out of a plurality of beams, as a maximum weight independent set of beams based on the created graph comprises the beam selection hardware accelerator being configured to: select a set of beams, out of one or more sets of beams that meet the angular separation of beams, that has a maximum weight, wherein the weight of a set of beams is determined as a sum of the beam weights or beam metrics associated with the beams of the set of beams.

Embodiment 9

The apparatus of any of embodiments 6-8, and further comprising: a processor, including computer instructions, when executed by the processor core, cause the processor to: determine the beam information for the plurality of beams; determine the information indicating the angular separation for beams of the selected set of beams; and, provide the beam information and the information indicating the angular separation to the beam selection hardware accelerator.

Embodiment 10

The apparatus of any of embodiments 6-9, wherein the processor is further configured to perform data scheduling for the transmission time interval, including being configured to: perform a selection of a subset of user devices for data scheduling in the transmission time interval; and, perform frequency domain scheduling to allocate frequency resources for the transmission of data to the selected subset of user devices during the transmission time interval via the selected set of beams that were selected by the beam selection hardware accelerator.

Embodiment 11

The apparatus of any of embodiments 6-10, wherein the beam information comprises one or more of the following: a maximum number of layers; a maximum number of beams to be selected; a total number of the plurality of beams; a grid of beams (GOB) type indication; a beam mask indicating which of the plurality of beams may be considered to be selected; a set of beam pointing direction indicators including an indicator of a beam pointing direction for each of one or more of the plurality of beams; and a beam weight array including a beam weight or beam metric that indicates a beam scheduling priority for one or more of the plurality of beams, wherein the beam weight or beam metric for one or more of the plurality of the beams is based on one or more metrics or priorities of user devices that have identified the beam as a preferred beam.

Embodiment 12

The apparatus of any of embodiments 6-11, wherein the beam selection hardware accelerator being configured to create a graph based on the beam information and the angular separation comprises the beam selection hardware accelerator being configured to perform at least one of the following: create a generalized interference graph if a grid of beams (GOB) type is a 3D (three-dimensional) GOB type; and create a circular arc graph if a GOB type is a Azimuth GOB type.

Embodiment 13

The apparatus of any of embodiments 6-12, wherein the selected set of beams comprises a set of beams such that the weight of the selected set of beams is a maximum weight among the sets of beams containing at most the maximum number of beams in which each beam in the selected set of beams satisfies the angular separation with respect to other beams of the selected set of beams.

Embodiment 14

The apparatus of any of embodiments 6-13, wherein the beam selection hardware accelerator being configured to create a graph based on the beam information and the angular separation comprises the beam selection hardware accelerator being configured to: create a graph in which each beam is represented as a vertex in the graph, and one or more pairs of vertices in the graph are connected by an edge if the beams represented by the pair of indices are less than the angular separation apart.

Embodiment 15

The apparatus of any of embodiments 6-14, wherein the beam selection hardware accelerator being configured to create a graph based on the beam information and the angular separation comprises the beam selection hardware accelerator being configured to: create a circular graph including: construct per-beam circular arcs on a circle, where each arc is located based on the beam's pointing direction; construct a circular arc graph, in which each vertex of the circular arc graph represents one of the arcs and an associated beam, and wherein a pair of vertices are connected by an edge if their arcs overlap, wherein two beams that are connected by an edge are less than the angular separation apart.

Embodiment 16

The apparatus of any of embodiments 6-15, wherein the processor comprises one or more processor cores.

Embodiment 17

The apparatus of any of embodiments 6-16, and further comprising: the processor is configured to create an event, including an indication of a memory location where the beam information and an angular separation of beams is stored, and a reply-to address that includes at least one of a processor core ID and queue ID, and enqueues the event in a queue; the beam selection hardware accelerator is configured to fetch information associated with the event, including the beam information and the angular separation of beams, from the memory location; the beam selection hardware accelerator is configured to enqueue a response event back to the reply-to queue ID; and wherein the processor is configured to receive the response event based on the reply-to core ID or the reply-to queue ID.

Embodiment 18

An apparatus comprising: a shared memory; a processor core, including computer instructions, when executed by the processor, cause the processor core to: determine a beam information for a plurality of beams; determine information indicating an angular separation for a selected set of beams; provide the beam information and the information indicating the minimum angular separation to a beam selection hardware accelerator; and the beam selection hardware accelerator that is configured to: receive the beam information and the information indicating the angular separation from the shared memory; create a graph based on the beam information and the minimum angular separation; select a set of beams as a maximum weight independent set of beams based on the created graph; and provide a notification to the processor of the selected set of beams.

Embodiment 19

The apparatus of embodiment 18, wherein the beam selection hardware accelerator being configured to provide a notification comprises the beam selection hardware accelerator being configured to: store an indication of the selected set of beams to a shared memory that is accessible by the beam selection hardware accelerator and the processor; and provide a notification to the processor that a set of beams has been selected.

Embodiment 20

The apparatus of any of embodiments 18-19, wherein the beam selection hardware accelerator being configured to select a set of beams, out of a plurality of beams, as a maximum weight independent set of beams based on the created graph comprises the beam selection hardware accelerator being configured to: select a set of beams, out of one or more sets of beams that meet the angular separation of beams, that has a maximum weight, wherein the weight of a set of beams is determined as a sum of the beam weights or beam metrics associated with the beams of the set of beams.

Embodiment 21

The apparatus of any of embodiments 18-20, wherein the processor is further configured to perform data scheduling for the transmission time interval, including being configured to: perform a selection of a subset of user devices and a subset of beams for data scheduling in the transmission time interval; perform frequency domain scheduling to allocate frequency resources for the transmission of data to the selected subset of users during the transmission time interval via the selected set of beams that were selected by the beam selection hardware accelerator.

Embodiment 22

The apparatus of any of embodiments 18-21, wherein the beam information comprises one or more of the following: a maximum number of layers; a maximum number of beams to be selected; a total number of the plurality of beams; a grid of beams (GOB) type indication; a beam mask indicating which of the plurality of beams may be considered to be selected; a set of beam pointing direction indicators including an indicator of a beam pointing direction for each of one or more of the plurality of beams; and a beam weight array including a beam weight or beam metric that indicates a beam scheduling priority for one or more of the plurality of beams, wherein the beam weight or beam metric for one or more of the plurality of the beams is based on one or more metrics or priorities of user devices that have identified the beam as a preferred beam.

Embodiment 23

The apparatus of any of embodiments 18-22, wherein the beam selection hardware accelerator being configured to create a graph based on the beam information and the angular separation comprises the beam selection hardware accelerator being configured to perform at least one of the following: create a generalized interference graph if a grid of beams (GOB) type is a 3D (three-dimensional) GOB type; and create a circular arc graph if a GOB type is a Azimuth GOB type.

Embodiment 24

The apparatus of any of embodiments 18-23, wherein the selected set of beams comprises a set of beams such that the weight of the selected beam set is the maximum weight among the sets of beams in which each beam in the selected set of beams is separated from the other beams in the selected set by at least the angular separation.

Embodiment 25

The apparatus of any of embodiments 18-24, wherein the beam selection hardware accelerator being configured to create a graph based on the beam information and the angular separation comprises the beam selection hardware accelerator being configured to: create a graph in which each beam is represented as a vertex in the graph, and one or more pairs of vertices in the graph are connected by an edge if the beams represented by the pair of indices are less than the angular separation apart.

Embodiment 26

The apparatus of any of embodiments 18-25, wherein the beam selection hardware accelerator being configured to create a graph based on the beam information and the angular separation comprises the beam selection hardware accelerator being configured to: create a circular graph including: construct per-beam circular arcs on a circle, where each arc is located based on the beam's pointing direction; construct a circular arc graph, in which each vertex of the circular arc graph represents one of the arcs and an associated beam, and wherein a pair of vertices are connected by an edge if their arcs overlap, wherein two beams that are connected by an edge are less than the angular separation apart.

Figure 10:
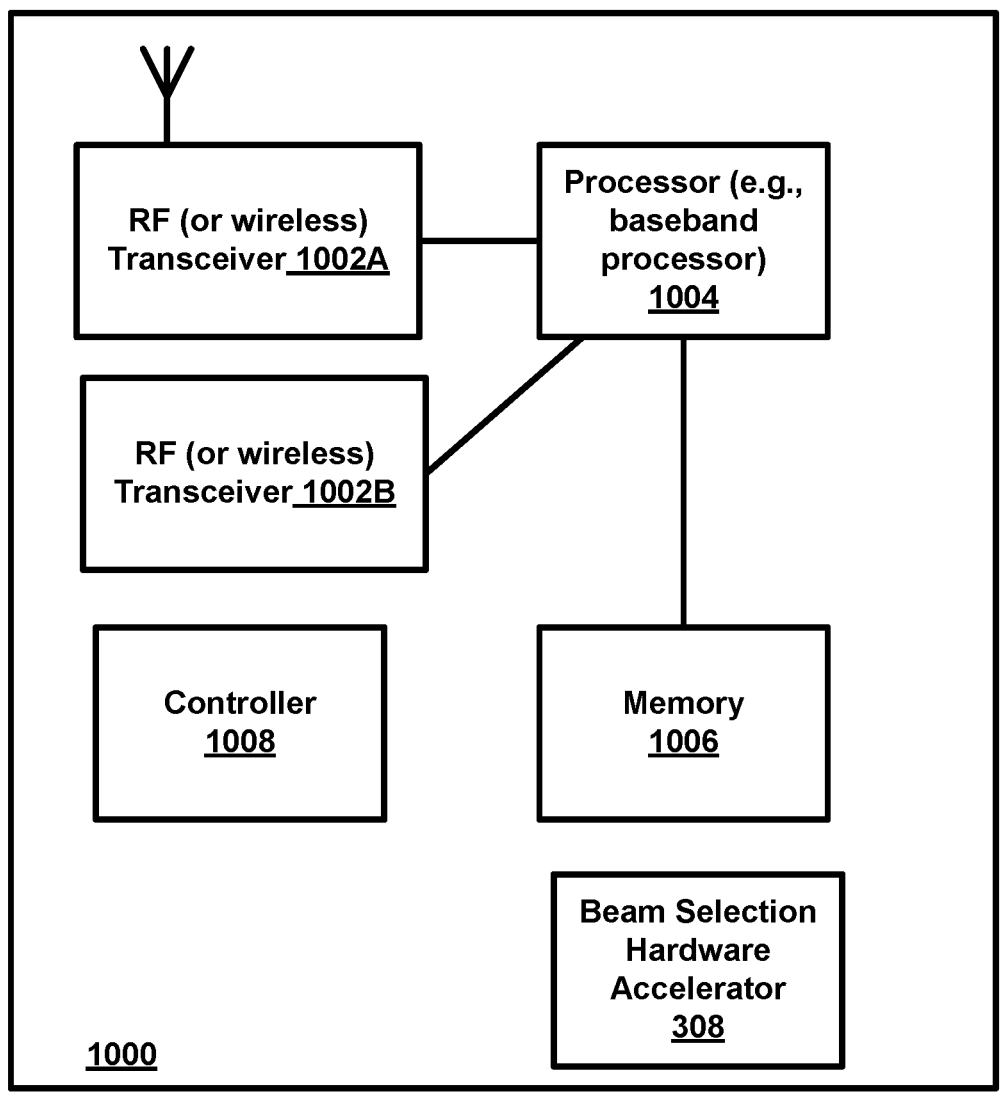
FIG. 10 is a block diagram of a node or wireless station (e.g., base station/access point, relay node or mobile station/user device/UE) according to an example embodiment.

FIG. 10 is a block diagram of a wireless station (e.g., AP, BS, relay node, eNB/gNB, UE or user device) 1000 according to an example embodiment. The wireless station 1000 may include, for example, one or two RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 10, a controller (or processor) 1008 may execute software and instructions, and may provide overall control for the station 1000, and may provide control for other systems not shown in FIG. 10, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example embodiment, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

Also, as shown, wireless station 1000 may include a beam selection hardware accelerator 308.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations may be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising:
   a beam selection hardware accelerator configured to determine a set of beams to be used for data scheduling by a wireless node for a transmission time interval, including being configured to:
   receive a beam information and information indicating an angular separation of beams for a set of selected beams;
   create a graph based on the beam information and the angular separation;
   select a set of beams, out of a plurality of beams, as a maximum weight independent set of beams based on the created graph; and
   provide a notification of the selected set of beams; and
   wherein the graph comprises at least one of a generalized interference graph, or a circular arc graph;
   wherein the beam selection hardware accelerator being configured to create a graph based on the beam information and the angular separation comprises the beam selection hardware accelerator being configured to perform at least one of the following:
   create a generalized interference graph if a grid of beams (GOB) type is a 3D (three-dimensional) GOB type; and
   create a circular arc graph if a GOB type is a Azimuth GOB type.

2. The apparatus of claim 1 wherein the beam selection hardware accelerator being configured to provide a notification comprises the beam selection hardware accelerator being configured to:
   store an indication of the selected set of beams to a shared memory; and
   notify a processor or processor core of the selected set of beams.

3. The apparatus of claim 2, wherein the processor comprises one or more processor cores.

4. The apparatus of claim 2, and further comprising:
   the processor is configured to create an event, including an indication of a memory location where the beam information and an angular separation of beams is stored, and a reply-to address that includes at least one of a processor core ID and queue ID, and enqueues the event in a queue;
   the beam selection hardware accelerator is configured to fetch information associated with the event, including the beam information and the angular separation of beams, from the memory location;
   the beam selection hardware accelerator is configured to enqueue a response event back to the reply-to queue ID; and
   wherein the processor is configured to receive the response event based on the reply-to core ID or the reply-to queue ID.

5. The apparatus of claim 1 wherein the beam selection hardware accelerator being configured to select a set of beams, out of a plurality of beams, as a maximum weight independent set of beams based on the created graph comprises the beam selection hardware accelerator being configured to:
   select a set of beams, out of one or more sets of beams that meet the angular separation of beams, that has a maximum weight, wherein a weight of a set of beams is determined as a sum of the beam weights or beam metrics associated with the beams of the set of beams.

6. The apparatus of claim 1, and further comprising:
   a processor, including computer instructions, when executed by the processor core, cause the processor to:
   determine the beam information for the plurality of beams;
   determine information indicating the angular separation for beams of the selected set of beams;
   provide the beam information and the information indicating the angular separation to the beam selection hardware accelerator.

7. The apparatus of claim 1 wherein the processor is further configured to perform data scheduling for the transmission time interval, including being configured to:
   perform a selection of a subset of user devices for data scheduling in the transmission time interval;
   perform frequency domain scheduling to allocate frequency resources for the transmission of data to the selected subset of user devices during the transmission time interval via the selected set of beams that were selected by the beam selection hardware accelerator.

8. The apparatus of claim 1 wherein the beam information comprises one or more of the following:
   a maximum number of layers;
   a maximum number of beams to be selected;
   a total number of the plurality of beams;
   a grid of beams (GOB) type indication;
   a beam mask indicating which of the plurality of beams may be considered to be selected;
   a set of beam pointing direction indicators including an indicator of a beam pointing direction for each of one or more of the plurality of beams; and
   a beam weight array including a beam weight or beam metric that indicates a beam scheduling priority for one or more of the plurality of beams, wherein the beam weight or beam metric for one or more of the plurality of the beams is based on one or more metrics or priorities of user devices that have identified the beam as a preferred beam.

9. The apparatus of claim 1, wherein the selected set of beams comprises a set of beams such that the weight of the selected set of beams is a maximum weight among the sets of beams containing at most the maximum number of beams in which each beam in the selected set of beams satisfies the angular separation with respect to other beams of the selected set of beams.

10. The apparatus of claim 1 wherein the beam selection hardware accelerator being configured to create a graph based on the beam information and the angular separation comprises the beam selection hardware accelerator being configured to:
    create a graph in which each beam is represented as a vertex in the graph, and one or more pairs of vertices in the graph are connected by an edge if the beams represented by a pair of indices are less than the angular separation apart.

11. The apparatus of claim 1 wherein the beam selection hardware accelerator being configured to create a graph based on the beam information and the angular separation comprises the beam selection hardware accelerator being configured to:

create a circular graph including:
construct per-beam circular arcs on a circle, where each arc is located based on a beam's pointing direction;
construct a circular arc graph, in which each vertex of the circular arc graph represents one of the arcs and an associated beam, and wherein a pair of vertices are connected by an edge if arcs for the pair of vertices or for two beams overlap, wherein two beams that are connected by an edge are less than the angular separation apart.

12. An apparatus comprising:
a shared memory;
a processor core, including computer instructions, when executed by a processor, cause the processor core to:
determine a beam information for a plurality of beams;
determine information indicating an angular separation for a selected set of beams;
provide beam information and the information indicating the minimum angular separation to a beam selection hardware accelerator; and
the beam selection hardware accelerator that is configured to:
receive the beam information and the information indicating the angular separation from the shared memory;
create a graph based on the beam information and the minimum angular separation;
select a set of beams as a maximum weight independent set of beams based on the created graph; and
provide a notification to the processor of the selected set of beams; and
wherein the graph comprises at least one of a generalized interference graph, or a circular arc graph;
wherein the beam selection hardware accelerator being configured to create a graph based on the beam information and the angular separation comprises the beam selection hardware accelerator being configured to perform at least one of the following:
create a generalized interference graph if a grid of beams (GOB) type is a 3D (three-dimensional) GOB type; and
create a circular arc graph if a GOB type is a Azimuth GOB type.

13. The apparatus of claim 12 wherein the beam selection hardware accelerator being configured to provide a notification comprises the beam selection hardware accelerator being configured to:
store an indication of the selected set of beams to a shared memory that is accessible by the beam selection hardware accelerator and the processor; and
provide a notification to the processor that a set of beams has been selected.

14. The apparatus of claim 12 wherein the beam selection hardware accelerator being configured to select a set of beams, out of a plurality of beams, as a maximum weight independent set of beams based on the created graph comprises the beam selection hardware accelerator being configured to:
select a set of beams, out of one or more sets of beams that meet the angular separation of beams, that has a maximum weight, wherein a weight of a set of beams is determined as a sum of the beam weights or beam metrics associated with the beams of the set of beams.

15. The apparatus of claim 12 wherein the processor is further configured to perform data scheduling for the transmission time interval, including being configured to:
perform a selection of a subset of user devices and a subset of beams for data scheduling in the transmission time interval;
perform frequency domain scheduling to allocate frequency resources for the transmission of data to the selected subset of users during the transmission time interval via the selected set of beams that were selected by the beam selection hardware accelerator.

16. The apparatus of claim 12 wherein the beam information comprises one or more of the following:
a maximum number of layers;
a maximum number of beams to be selected;
a total number of the plurality of beams;
a grid of beams (GOB) type indication;
a beam mask indicating which of the plurality of beams may be considered to be selected;
a set of beam pointing direction indicators including an indicator of a beam pointing direction for each of one or more of the plurality of beams; and
a beam weight array including a beam weight or beam metric that indicates a beam scheduling priority for one or more of the plurality of beams, wherein the beam weight or beam metric for one or more of the plurality of the beams is based on one or more metrics or priorities of user devices that have identified the beam as a preferred beam.

17. The apparatus of claim 12, wherein the selected set of beams comprises a set of beams such that a weight of the selected beam set is the maximum weight among the sets of beams in which each beam in the selected set of beams is separated from the other beams in the selected set by at least the angular separation.

18. The apparatus of claim 12 wherein the beam selection hardware accelerator being configured to create a graph based on the beam information and the angular separation comprises the beam selection hardware accelerator being configured to:
create a graph in which each beam is represented as a vertex in the graph, and one or more pairs of vertices in the graph are connected by an edge if the beams represented by a pair of indices are less than the angular separation apart.

19. The apparatus of claim 12 wherein the beam selection hardware accelerator being configured to create a graph based on the beam information and the angular separation comprises the beam selection hardware accelerator being configured to:
create a circular graph including:
construct per-beam circular arcs on a circle, where each arc is located based on a beam's pointing direction;
construct a circular arc graph, in which each vertex of the circular arc graph represents one of the arcs and an associated beam, and wherein a pair of vertices are connected by an edge if arcs for the pair of vertices or for two beams overlap, wherein two beams that are connected by an edge are less than the angular separation apart.

* * * * *